(12) United States Patent
Oh et al.

(10) Patent No.: US 11,548,732 B2
(45) Date of Patent: Jan. 10, 2023

(54) COMPUTERIZED SYSTEMS AND METHODS FOR ASSISTED PICKING PROCESSES

(71) Applicant: Coupang, Corp., Seoul (KR)

(72) Inventors: Jeong Seok Oh, Seoul (KR); Ji Eun Kim, Seoul (KR); Chang Geun Jin, Seoul (KR); Sang Ho Yim, Seoul (KR); Woong Kim, Seoul (KR)

(73) Assignee: COUPANG CORP., Seoul (KR)

( * ) Notice: Subject to any disclaimer, the term of this patent is extended or adjusted under 35 U.S.C. 154(b) by 140 days.

(21) Appl. No.: 17/082,214

(22) Filed: Oct. 28, 2020

(65) Prior Publication Data

US 2021/0039885 A1    Feb. 11, 2021

Related U.S. Application Data

(63) Continuation of application No. 16/808,060, filed on Mar. 3, 2020, now Pat. No. 10,870,537, which is a
(Continued)

(51) Int. Cl.
  *B65G 1/137*  (2006.01)
  *G05B 15/02*  (2006.01)

(52) U.S. Cl.
  CPC ......... *B65G 1/1373* (2013.01); *B65G 1/1371* (2013.01); *G05B 15/02* (2013.01); *B65G 2209/02* (2013.01); *B65G 2209/04* (2013.01)

(58) Field of Classification Search
  CPC combination set(s) only.
  See application file for complete search history.

(56) References Cited

U.S. PATENT DOCUMENTS 7,504,948 B2    3/2009    Rouaix et al.
7,504,949 B1 *  3/2009    Rouaix ................. G06Q 10/06
                                                    340/572.1
(Continued)

FOREIGN PATENT DOCUMENTS

CN    105858045 A    8/2016
CN    110880086      3/2020
(Continued)

OTHER PUBLICATIONS

Substantive Examination Notice issued in a counterpart Hong Kong Patent Application No. 22020004010.7 (6 pages).
(Continued)

*Primary Examiner* — Kyle O Logan
(74) *Attorney, Agent, or Firm* — Finnegan, Henderson, Farabow, Garrett & Dunner, LLP

(57) ABSTRACT

Embodiments of the disclosure include a computer implemented system including at least one processor and memory storing instructions. In one embodiment, a system receives a batch identifier, determines a number of containers, sends the number of containers to a user device, and receives a first container identifier from a user device. The system retrieves a location identifier of a first item, sends the location identifier to the user device, and receives a physical location identifier from the user device. The system sends to the user device the first item when the physical location identifier matches the location identifier. The system receives a physical item identifier of the first item and sends a destination to the user device to bring the container.

20 Claims, 23 Drawing Sheets

Related U.S. Application Data continuation of application No. 16/298,403, filed on Mar. 11, 2019, now Pat. No. 10,618,735.

(56) References Cited

U.S. PATENT DOCUMENTS

| | | | | |
|---|---|---|---|---|
| 8,326,679 | B1* | 12/2012 | Rowe | G06Q 10/08 705/28 |
| 8,423,431 | B1* | 4/2013 | Rouaix | G06Q 10/087 705/28 |
| 8,571,702 | B1* | 10/2013 | Haake | G06Q 10/047 705/26.1 |
| 8,862,150 | B2* | 10/2014 | Phillips | H04W 4/021 455/414.1 |
| 9,230,233 | B1 | 1/2016 | Sundaresan et al. | |
| 9,741,007 | B1 | 8/2017 | Rouaix | |
| 10,040,631 | B2 | 8/2018 | Shakes et al. | |
| 2006/0025883 | A1* | 2/2006 | Reeves | G06Q 10/08 700/216 |
| 2008/0177418 | A1* | 7/2008 | Schaefer | B65G 1/1371 700/215 |
| 2009/0074545 | A1* | 3/2009 | Lert, Jr. | B65G 1/1378 414/267 |
| 2013/0247519 | A1* | 9/2013 | Clark | B65B 57/00 53/452 |
| 2014/0107833 | A1* | 4/2014 | Segawa | G06Q 10/087 700/214 |
| 2014/0351101 | A1* | 11/2014 | Danelski | G06Q 30/06 705/28 |
| 2016/0148300 | A1* | 5/2016 | Carr | G06Q 30/0633 705/26.8 |
| 2016/0148303 | A1* | 5/2016 | Carr | G06Q 30/0635 705/26.81 |
| 2016/0176635 | A1* | 6/2016 | Varley | B65G 1/137 700/216 |
| 2016/0347546 | A1 | 12/2016 | Shakes et al. | |
| 2018/0059635 | A1 | 3/2018 | Johnson et al. | |
| 2018/0218185 | A1* | 8/2018 | High | G06Q 10/087 |
| 2019/0127147 | A1* | 5/2019 | Wagner | B62D 1/28 |

FOREIGN PATENT DOCUMENTS

| | | |
|---|---|---|
| CN | 110880086 A | 3/2020 |
| JP | H0717611 A | 1/1995 |
| JP | 2008-532888 | 8/2008 |
| JP | 2008-532888 A | 8/2008 |
| JP | 2013234012 A | 11/2013 |
| KR | 20110096392 A | 8/2011 |
| KR | 10-2014-0101117 A | 8/2014 |
| KR | 20160001579 A | 1/2016 |
| KR | 10-2017-0020901 A | 2/2017 |
| KR | 10-2018-0109216 A | 10/2018 |
| KR | 20190016015 A | 2/2019 |
| KR | 10-2316577 | 10/2021 |
| WO | WO 2016/105744 A1 | 6/2016 |

OTHER PUBLICATIONS

Preliminary Rejection dated Dec. 1, 2020 and issued in a counterpart Korean Patent Application No. 10-2019-0057672 (15 pages).
Office Action for counterpart JP Application No. 2020-537697 dated Jun. 1, 2021 (3 pages).
Notice of Preliminary Rejection dated Apr. 20, 2022, by the Korean Patent Office in counterpart Korean Patent Application No. 10-2022-0028834, 17 pages (including translation).
International Search Report and Written Opinion dated Jun. 30, 2020 issued in PCT Application No. PCT/IB2020/052071, 8 pages.
Office Action and Search Report, dated Sep. 7, 2020, issued in counterpart Republic of China Patent Application No. 109107903 and an English translation thereof (13 pages).
Extended European Search Report from the European Patent Office in European Application No. EP 20 76 9069, dated Jan. 28, 2022, 8 pages.
Notice of Allowance dated Dec. 7, 2021, by the Korean Patent Office in counterpart Korean Application No. 10-2021-0138685, 4 pages.
First Examination Report dated Dec. 8, 2021, by the Indian Patent Office in counterpart Indian Application No. 202047049310, 7 pages.
Decision for Patent dated Jan. 11, 2022, by the Japanese Patent Office in counterpart Japanese Application No. 2020-537697, 4 pages.
Notice of Final Rejection dated Jul. 11, 2022, by the Korean Patent Office in counterpart Korean Patent Application No. 10-2022-0028834, 8 pages (including translation).
Singapore Examination Report in counterpart Singapore Patent Application No. 11202011425U dated Sep. 6, 2022, 9 pages.
Notice of Final Rejection in counterpart Korean Application No. 10-2022-0028834 dated Oct. 25, 2022 (6 pages).

* cited by examiner login  Sign Up  Service center

Category | Cheese | ? | 🛒

My Orders  Shopping Cart all 'Cheese' (65,586)          Gift Cards filter

65,586 results for 'Cheese'
Related searches: Sliced cheese  baby cheese  cheddar cheese
string cheese  butter  pizza cheese  cream cheese  cheese stick
cubed cheese  parmesan cheese ☐ Fast Delivery
☐ Imported Product 6 per page category
All
Food
Silverware
Kitchen utensils
Home electronics digital
Household goods
 View more

CHEDDAR

FREE Shipping
Sliced cheese, 18g,
100 pieces
(88 won per 10 g)
Morning (Thursday)

(1294)

LOCAL FARM MILK

Mozzarella cheese,
1kg, 2 pieces
🚀
(103 won per 10 g)
Tomorrow (Wed)

(285)

100 grams of cheddar
sliced cheese,
18 grams, 100 pieces
(73 won per 10 g)
Morning (Thursday)

(862)

brands
 Local Milk
 Daily dairy
 Cattle and trees
View more

REAL GRATED PARMESAN

Grated Parmesan
Cheese, 85g, 1 piece
🚀
(389 won per 10g)
Tomorrow (Wed)

(839)

Mozzarella cheese,
1 kg, 1
(85 won per 10g)
Morning (Thursday)

(379)

Cheese Heads String

FREE Shipping
1.36 kg of string
cheese
Morning (Thursday)

(337)

scope
All stars
 4 or more
 3 or more
 2 or more
 1 or more

FIG. 1B

Favorites  Application  login  Sign Up  Service center all

My Account  Shopping Cart

Shipments  Fast Shipments  Christmas  Gold deals  Regular delivery  Events / Coupons  Planned Exhibition
Gift Cards Home > Food > Daily products / ice cream > Cheese > Fresh cheese > Mozzarella mozzarella cheese
285 Reviews     20,000 won

FREE Shipping
Tomorrow (Wed) 11/28 Arrival Guarantee
Weight per piece x Quantity : 1kg x 2 pieces

| 1 | Add to cart | Buy now |

- Country of origin: See product description
- Shelf Life: 2019-11-04
- Total quantity: 2
- Cheese form: crushed (powder)
- Item Number: 23532 - 3432551

Products purchased by other customers

| Rosé spaghetti sauce, 600g, 2... | Chunky Tomato Pasta... | Grated Parmesan cheese, | Bacon and Mushroom Cream Pasta Sauce | Chili sauce, 295ml, 1 | Hot sauce, 2,340 won |
| 6,500 won | 3,800 won | 6,460 won | 4,870 won | 2,370 won | (66 won per 10ml) |
| (54 won per 10g) | (86 won per 10g) | (285 won per 10g) | (108 won per 10g) | (80 won per 10ml) | (245) |
| (3,721) | (545) | (1,330) | (3,193) | (2,552) | |

Product Details    Reviews (285)    Contact Us    Shipping & Returns

Required notation information

| Type of food | Natural cheese / frozen products | Producers and Locations | Cheese Corp. / Republic of Korea |
| Date of manufacture, shelf life or quality maintenance | Shelf Life: Products manufactured on or after November 04, 2019 : Manufactured goods after May 19, 2018 | Capacity (weight), quantity by packing unit | 1kg, 2 pieces |
| Ingredients and | Content reference | nutrient | None |

FIG. 1C

COMPUTERIZED SYSTEMS AND METHODS FOR ASSISTED PICKING PROCESSES

CROSS-REFERENCE TO RELATED APPLICATIONS

This application is a continuation of and claims the benefit of priority to U.S. application Ser. No. 16/808,060, filed Mar. 3, 2020 (now allowed), which is a continuation of and claims the benefit of priority to U.S. application Ser. No. 16/298,403 (now U.S. Pat. No. 10,618,735), filed Mar. 11, 2019. The contents of the above-noted applications are hereby incorporated by reference in their entirety.

TECHNICAL FIELD

The present disclosure generally relates to computerized systems and methods for fulfilling orders. In particular, embodiments of the present disclosure relate to inventive and unconventional systems for controlling fulfillment of orders.

BACKGROUND

E-commerce business is wide-spread for its convenience, and items that can be ordered electronically is various in kind. Because of the enormous number of items in a warehouse and complexity of orders, workers in a warehouse face inefficiency issues. In fact, various systems for picking items already exist to solve this issue.

The existing systems, however, are rudimentary in that they control picking tasks on an order-basis. That is, under existing systems, workers pick items until they complete picking every item in each order, regardless of where the ordered items are shelved in a warehouse. Considering the numerosity of items and space of a warehouse, these systems may waste time and labor of workers, especially when the ordered items are shelved physically far apart. Moreover, existing systems cannot effectively control workers' picking steps because they cannot effectively communicate with a central system while workers are picking items. For example, existing systems could not confirm whether workers are in the right location and/or whether workers have picked the right item in a warehouse. Therefore, there is a need for improved systems and methods for controlling fulfillment of order efficiently in an electronic manner.

SUMMARY

One aspect of the present disclosure is directed to a computer implemented system for fulfilling an order in a fulfillment center. The system may include at least one processor and at least one memory storing instructions. The system may receive an identifier associated with a batch, which are comprised of one or more items to be picked. The system may determine a number of containers for holding the one or more of the batch items and send the number of containers to a user device. The system may receive a container identifier associated with a first container for holding the one or more batch items. The system may retrieve a list of one or more items associated with the batch. The system may also retrieve a location identifier for a first item on the list of one or more items, send to the user device the location identifier, and receive a physical location identifier from the user device. The system may send, to the user device for display, the listed first item when the received physical location identifier matches the location identifier. The system may receive, from the user device, a physical item identifier associated with the picked first item. And the system may send, to the user device for display, a destination to which to bring the container when the received physical item identifier matches an item identifier of the first item included in the list of one or more items.

Another aspect of the present disclosure is directed to a method for fulfilling a batch in a fulfillment center. The operation may comprise receiving an identifier associated with a batch, determining a number of containers for holding one or more of the batch items and displaying, and sending to a user device the determined number of containers. The operation may comprise receiving, from the user device, a container identifier associated with a first container for holding one or more items associated with the batch. The operation may comprise retrieving a list of one or more items associated with the batch. The operation may comprise retrieving a location identifier for a first item, sending the location identifier to the user device, and receiving a physical location identifier from the user device. The operation may comprise sending, to the user device for display, the listed first item when the received physical location identifier matches the location identifier. The operation may comprise receiving, from the user device, a physical item identifier associated with the picked first item. And, the operation may comprise sending, to the user device for display, a destination to which to bring the container when the received physical item identifier matches an item identifier of the first item included in the list of one or more items.

Yet another aspect of the present disclosure is directed to a computer implemented system for fulfilling a batch in a fulfillment center. The system may include at least one processor, at least one user device, and at least one memory storing instructions. The user device may include at least one display and at least one input device for receiving information. The system may receive an identifier associated with a batch, which are comprised of one or more items to be picked. The system may determine a number of containers for holding the one or more of the batch items and send the number of containers to a user device. The system may receive a container identifier associated with a first container for holding the one or more batch items. The system may retrieve a list of one or more items associated with the batch. The system may also retrieve a location identifier for a first item on the list of one or more items, send to the user device the location identifier, and receive a physical location identifier from the user device. The system may send, to the user device for display, the listed first item when the received physical location identifier matches the location identifier. The system may receive, from the user device, a physical item identifier associated with the picked first item. The system may receive, from the user device, an indication to move an item from the first container to another container, along with the first container identifier, a physical item identifier of the item to be moved, and the second container identifier. And the system may send, to the user device for display, a destination to which to bring the first container and the second container.

Other systems, methods, and computer-readable media are also discussed herein.

BRIEF DESCRIPTION OF THE DRAWINGS

FIG. 1B depicts a sample Search Result Page (SRP) that includes one or more search results satisfying a search request along with interactive user interface elements, consistent with the disclosed embodiments.

FIG. 1C depicts a sample Single Display Page (SDP) that includes a product and information about the product along with interactive user interface elements, consistent with the disclosed embodiments.

DETAILED DESCRIPTION

Figure 1A:
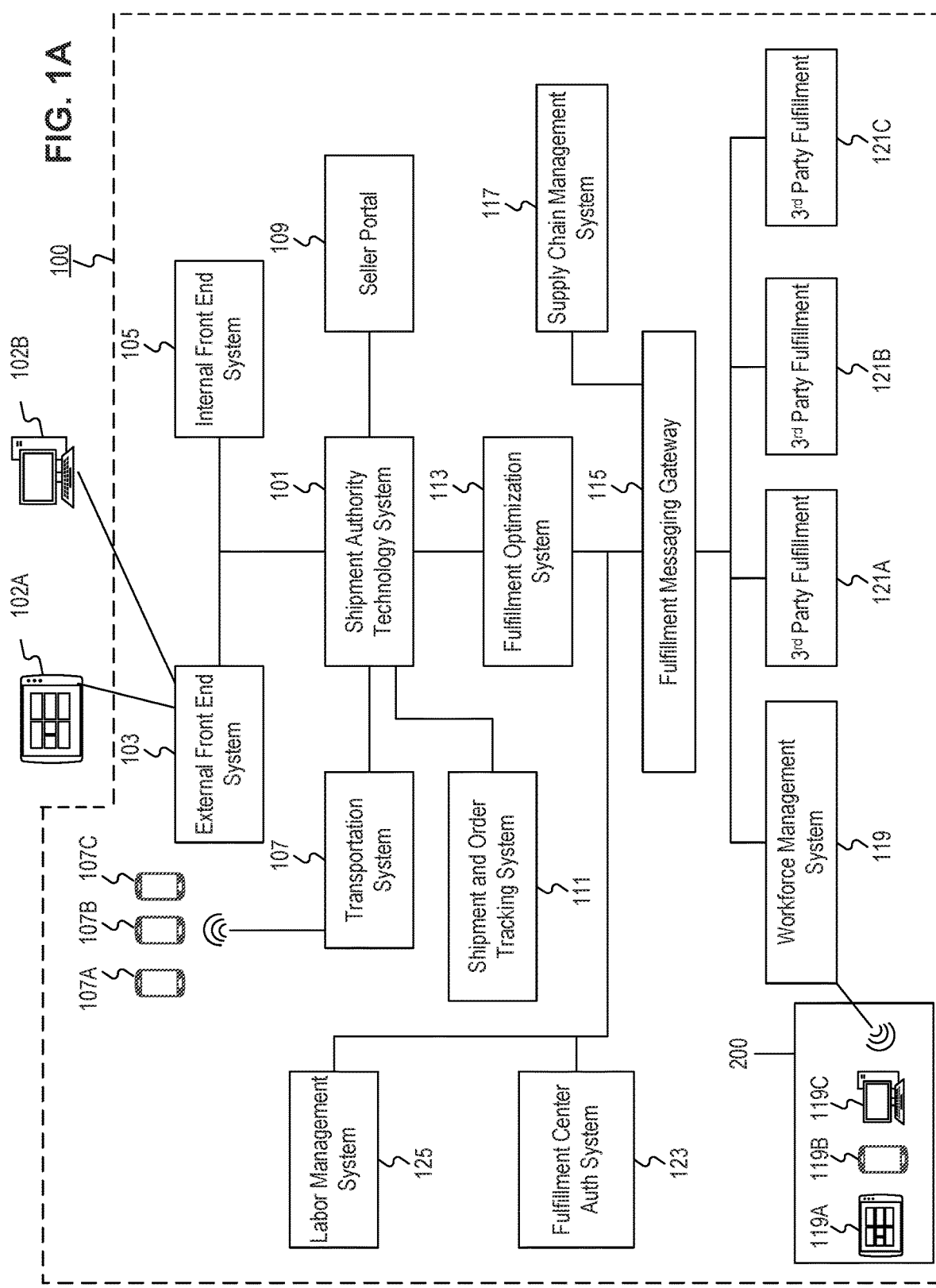
FIG. 1A is a schematic block diagram illustrating an exemplary embodiment of a network comprising computerized systems for communications enabling shipping, transportation, and logistics operations, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for controlling fulfillment of batches. The disclosed embodiments are advantageously capable of controlling workers' picking operation in an electronic manner. In one implementation, a worker may be provided a user device, such as a mobile device, to receive instructions. The user device may have a software program (e.g., an app), such as workflow management program, through which the workers receive step by step instructions during a picking operation. To start working, a worker may log-in to the app and provide an input that the worker would like to start a new batch.

A batch means a single picking operation assigned by a computer system (e.g., WMS 119 as described in FIG. 1A) and may include one or more items from single or multiple orders. When a user, such as a worker in a fulfillment center, warehouse, or similar building is assigned to a batch, the user may pick every item in the batch at once to complete the batch. Items in a batch may be comprised of the items that are shelved closely to each other. When there are multiple items in a batch, the computer system may determine in which order items should be picked. For example, the determined order may provide the shortest route for a worker. Based on its determination, the computer system may provide the worker a location identifier of the item using information stored in its server. The worker may scan a physical location identifier, and computer system may confirm if the worker is at the instructed location. The worker may scan a physical item identifier, and computer system may confirm whether the physical item identifier matches item identifier information saved in computer system.

When a user, such as a worker, is assigned to a batch, the computer system may indicate a number of containers and carts to necessary to pick the items in the batch. Because the user may expect a necessary number of containers and carts from the beginning, the user may not need to go back to get more containers in the middle of a picking operation, making the entire picking process more efficient. The computer system may store stock keeping unit (SKU) information. SKU is an identification of a particular product that allows it to be tracked, which includes volume information. The volume information associated with a SKU refers to the total amount of volume (e.g., in cubic meters) required to pack and ship the particular item. Based on SKU and volume information in the computer system, the computer system may calculate how many containers and carts will eventually be needed to fulfill a batch. The computer system may also store location information of items in the warehouse. Therefore, when a batch including one or more items is assigned to a user, computer system may determine a picking order and a route for the user.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT)

system 111, fulfillment optimization (FO) system 113, fulfillment messaging gateway (FMG) 115, supply chain management (SCM) system 117, workforce management system 119, mobile devices 119A, 119B, and 119C (depicted as being inside of fulfillment center (FC) 200), 3$^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from workforce management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Workforce management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2A, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 1196, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2A), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2A:
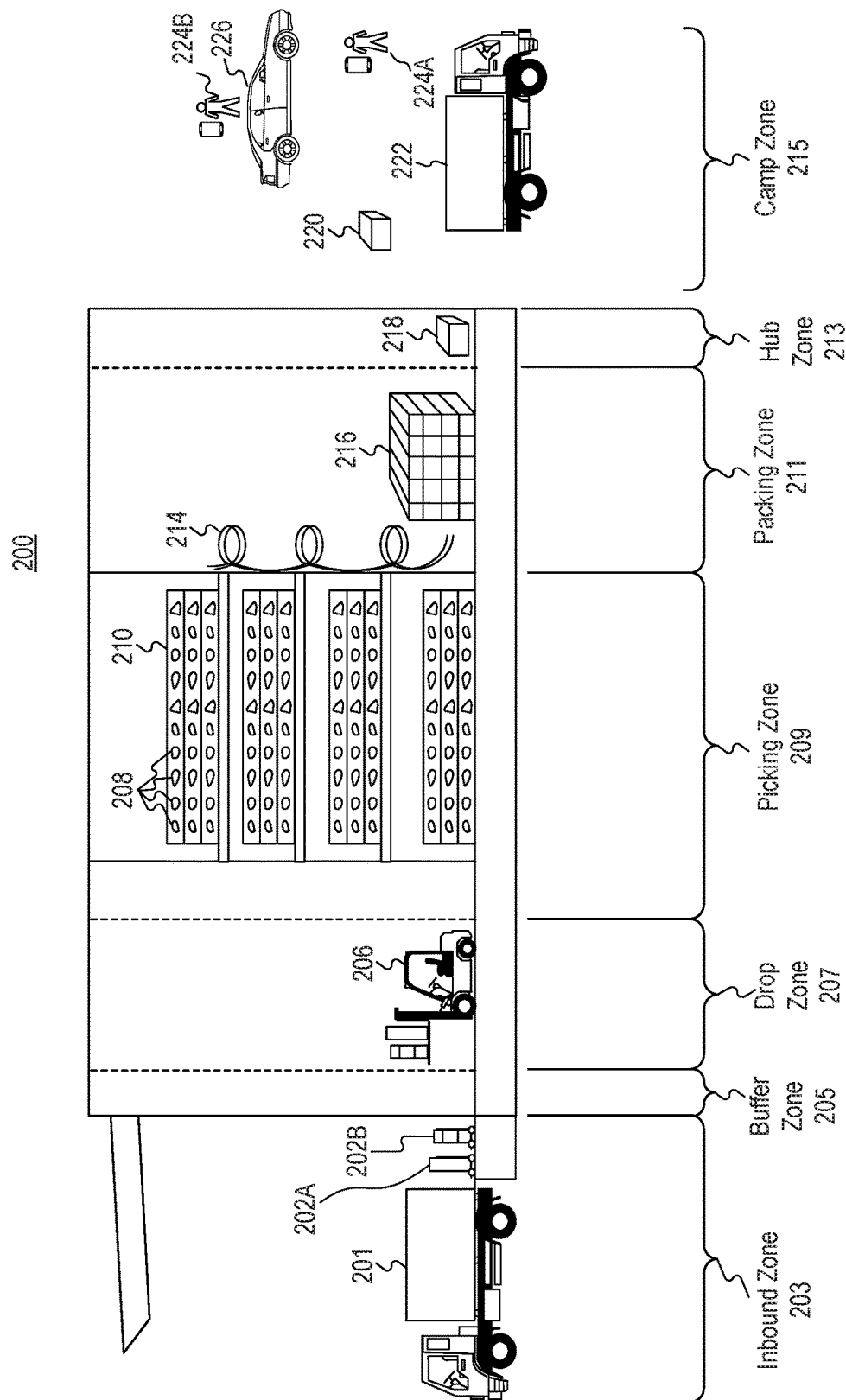
FIG. 2A is a diagrammatic illustration of an exemplary fulfillment center configured to utilize disclosed computerized systems, consistent with the disclosed embodiments.

FIG. 2A depicts a fulfillment center 200. Fulfillment center 200 is an example of a physical location that stores items for shipping to customers when ordered. Fulfillment center (FC) 200 may be divided into multiple zones, each of which are depicted in FIG. 2A. These "zones," in some embodiments, may be thought of as virtual divisions between different stages of a process of receiving items, storing the items, retrieving the items, and shipping the items. So while the "zones" are depicted in FIG. 2A, other divisions of zones are possible, and the zones in FIG. 2A may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker")

will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2A, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 2B:
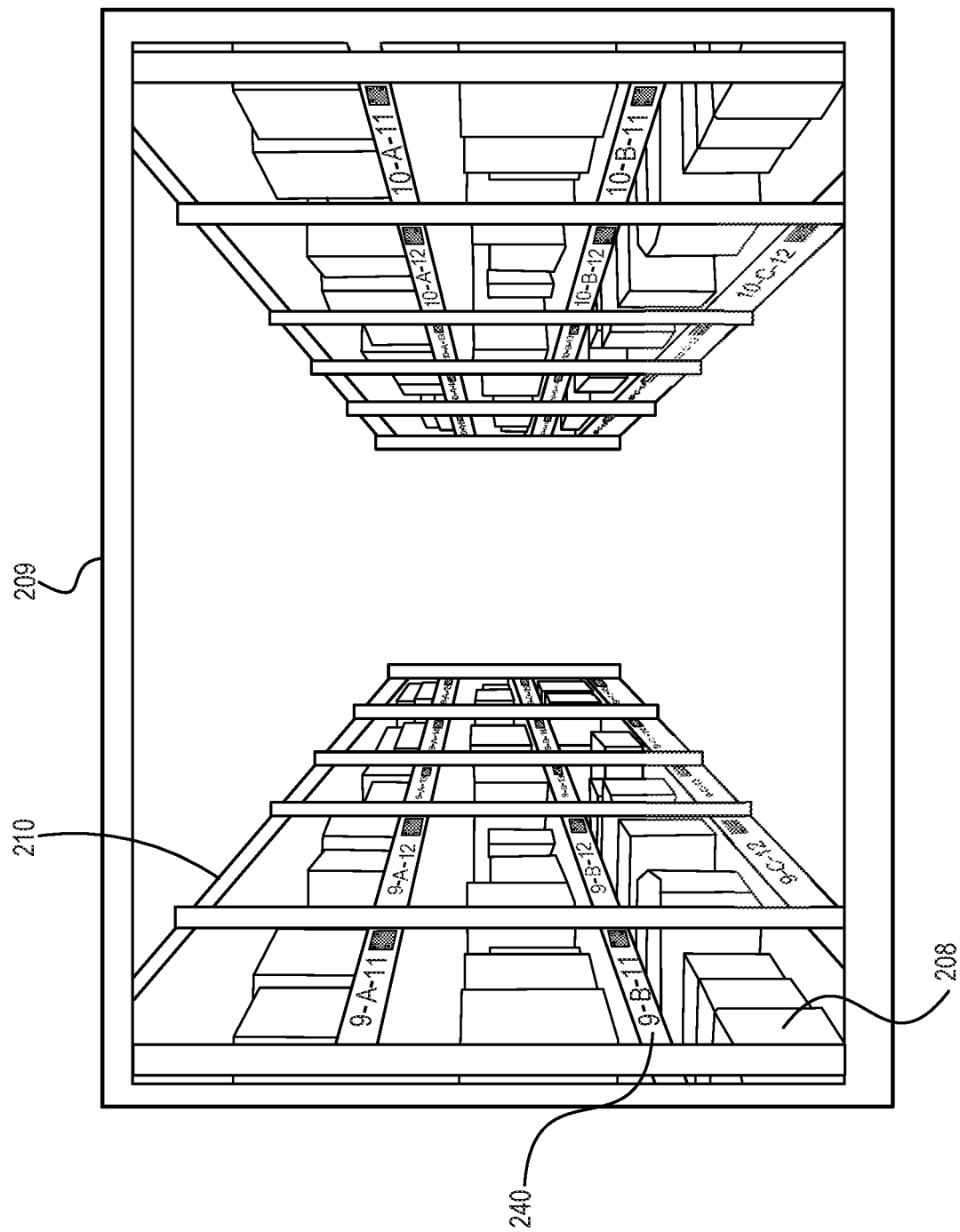
FIG. 2B is an illustration of an exemplary picking zone configured to utilize disclosed computerized systems, consistent with the disclosed embodiments.

FIG. 2B illustrates picking zone 209 of FIG. 2A in accordance with the disclosed embodiments. As shown in FIG. 2B, picking zone 209 may be in a warehouse, such as FC 200. In picking zone 209, items 208 are stored in storage units 210, which may include physical location identifier 240. Storage units 210, in some embodiments, may be physical shelving, bookshelves, boxes, totes, refrigerators, freezers, cold stores, or the like. Items 208, in some embodiments, may be a subject to sale and may be picked by a user (such as worker) or machine, or when a customer places an order for items 208 via a website hosted by external front end system 103. Physical location identifier 240, in some embodiments, may be a unique address of a particular location of storage units 210.

In some embodiments, storage units 210, such as a shelving, may have physical location identifier 240 attached to it. Physical location identifier 240 may be a unique address of a particular location of storage units 210. In some embodiments, physical location identifier 240 may indicate a particular item that is shelved at the location. But in other embodiments, physical location identifier 240 may indicate multiple items that are shelved together or closely together. Physical location identifier 240 may be an item barcode, RFID tag, or a matrix barcode, such as Quick Response (QR) code. A camera or a scanner in a user device, such as a mobile device 119B, may scan physical location identifier 240 using an input device, such as an imaging device including a camera or a scanner. The scanned information may be sent to WMS 119. Based on the scanned information, WMS 119 may determine whether a user is at a location that is designated by WMS 119.

A batch may include one or more items. A user, such as a worker, may pick items included in an assigned batch in picking zone 209, until every item in the batch is picked. A user may move in picking zone 209, such as a warehouse, on foot. In some embodiments, users may use other devices that assist movement such as scooter, robot and/or vehicles.

In some embodiments, a user device may assist a user to find a designated location. In some embodiments, a mobile device may show a user a map with navigation. For example, the mobile device may inform a user to turn left upon reaching a certain location. In some embodiments, a mobile device may provide a signal, including, but not limited to a map, sound, vibration or text message for assisting users to find a designated location.

Figure 2C:
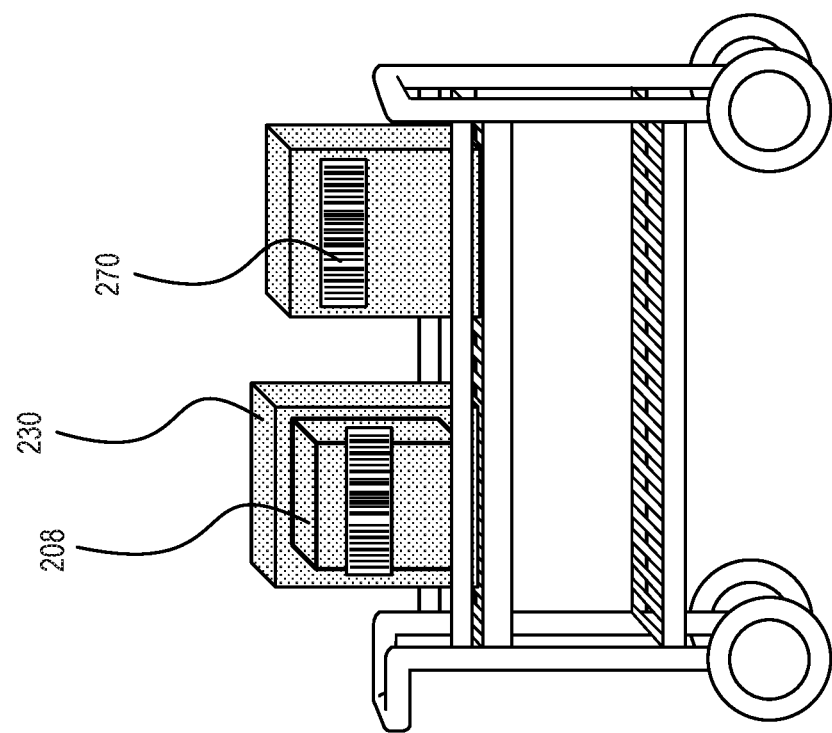
FIG. 2C is an illustration of an exemplary picking operation of a worker in picking zone, consistent with the disclosed embodiments.
Figure 2C:
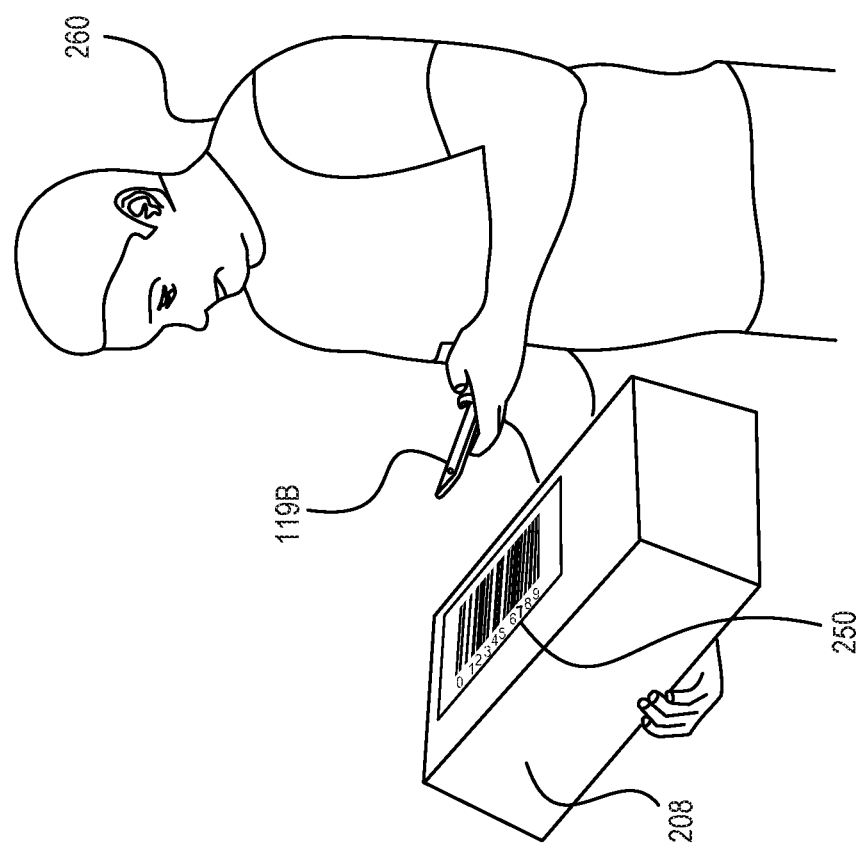

FIG. 2C illustrates a picking operation of a user 260, such as a worker, in picking zone 209 as shown in FIG. 2B. In some embodiments, item 208 may have physical item identifier 250 attached to item 208. But in other embodiments, physical item identifier 250 may not be attached to item 208 and may be located near item 208. Physical item identifier 250 may comprise one or more of an item barcode, RFID tag, a matrix barcode, such as Quick Response (QR) code, or the like.

A camera or a scanner in a user device, such as mobile device 119B, may scan physical item identifier 250. The scanned information may be transmitted to WMS 119 via wireless or wired network. Based on the received information, WMS 119 may confirm whether the scanned physical item identifier 250 matches item identifier information stored in WMS 119. When WMS 119 confirms that it matches, a mobile device 1196 may display to a user an instruction to pick item 208 and put it into container 230. User 260 may continue this picking operation until the last item in the batch is picked.

After the last item in a batch is picked, a user, such as a worker, may move the containers to a destination location, in accordance with an instruction displayed in a mobile device 1196. For example, a worker may scan destination identifier by scanning a destination barcode and transmit the scanned information to WMS 119. WMS 119 may share the scanned information with other systems, such as FO system 113 in fulfillment center via wireless or wired network. After every item in a batch is picked, containers 230 with the picked items are sent to a destination location. The sent items may be further processed and finally sent to customers.

Figure 3:
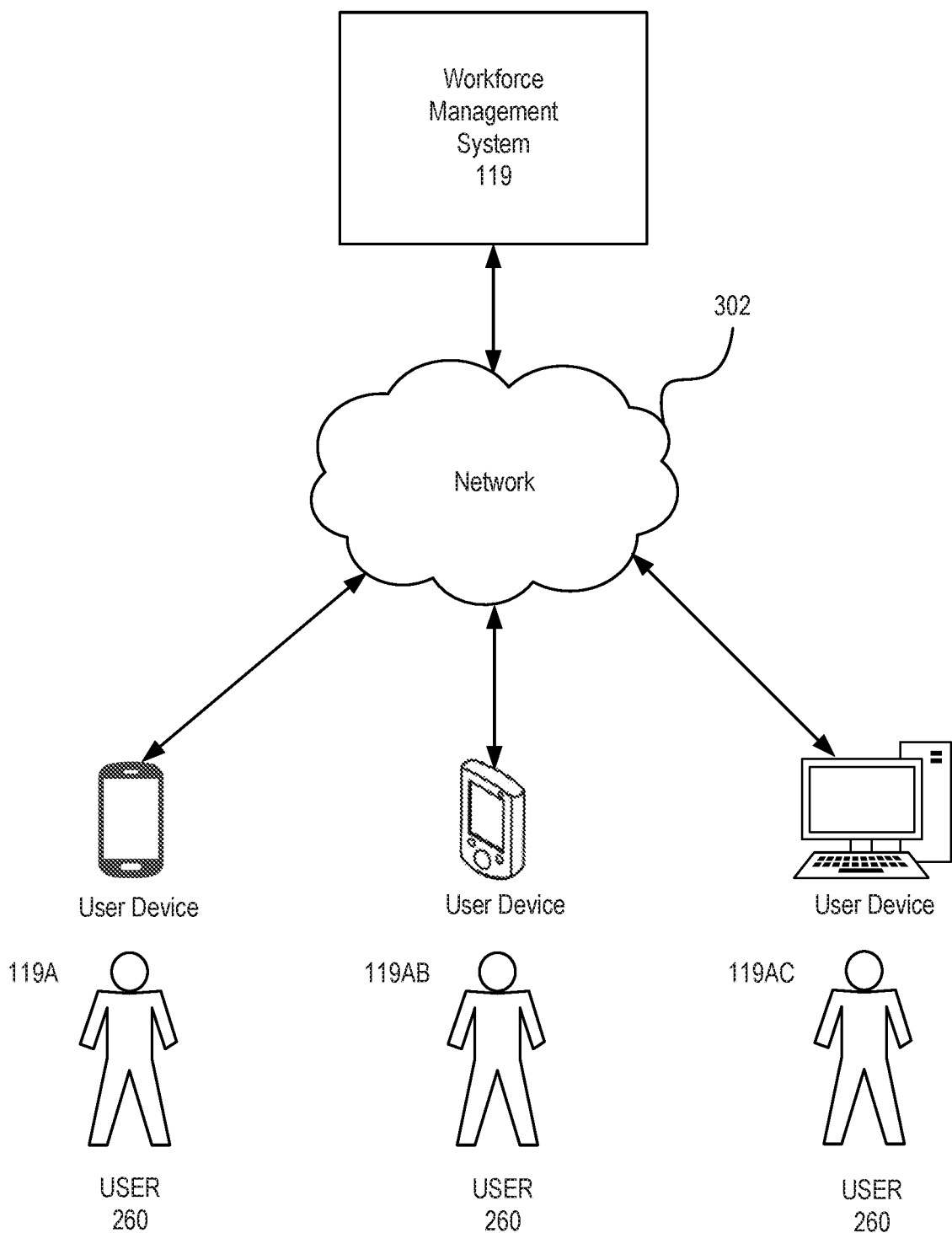
FIG. 3 depicts an exemplary network of devices in communication with Workforce Management System (WMS), consistent with the disclosed embodiments.

FIG. 3 depicts an exemplary network of devices in communication with Workforce Management System (WMS) 119, consistent with the disclosed embodiments. The components and arrangements shown in FIG. 3 are not intended to limit the disclosed examples, as the components used to implement the disclosed processes and features may vary.

In one embodiment, WMS 119 may communicate with user devices 119A-119C (tablet 119A, mobile device/PDA 1196, computer 119C) via network. User device 119A-119C may have a program installed thereon, which may enable user device 119A-119C to communicate with WMS 119, through a network.

Network 302 may comprise any type of computer networking arrangement used to exchange data. For example, network 302 may be the Internet, a private data network, a virtual private network using a public network, a WiFi network, a LAN or WAN network, and/or other suitable connections that may enable information exchange between WMS and user device 119A-119C.

Additionally, or alternatively, WMS 119 may communicate with user device 119A-119C through direct communications, rather than through network 302. Direct communication may use any suitable technologies, including, for example, Bluetooth™, Bluetooth LE™, WiFi near field communications or other suitable communication methods that provide a medium for transmitting data between WMS 119 and user devices 119A-119C. Other components known to one of ordinary skill in the art may be included in WMS 119 to process, transmit, provide, and receive information consistent with the disclosed example.

Figure 4:
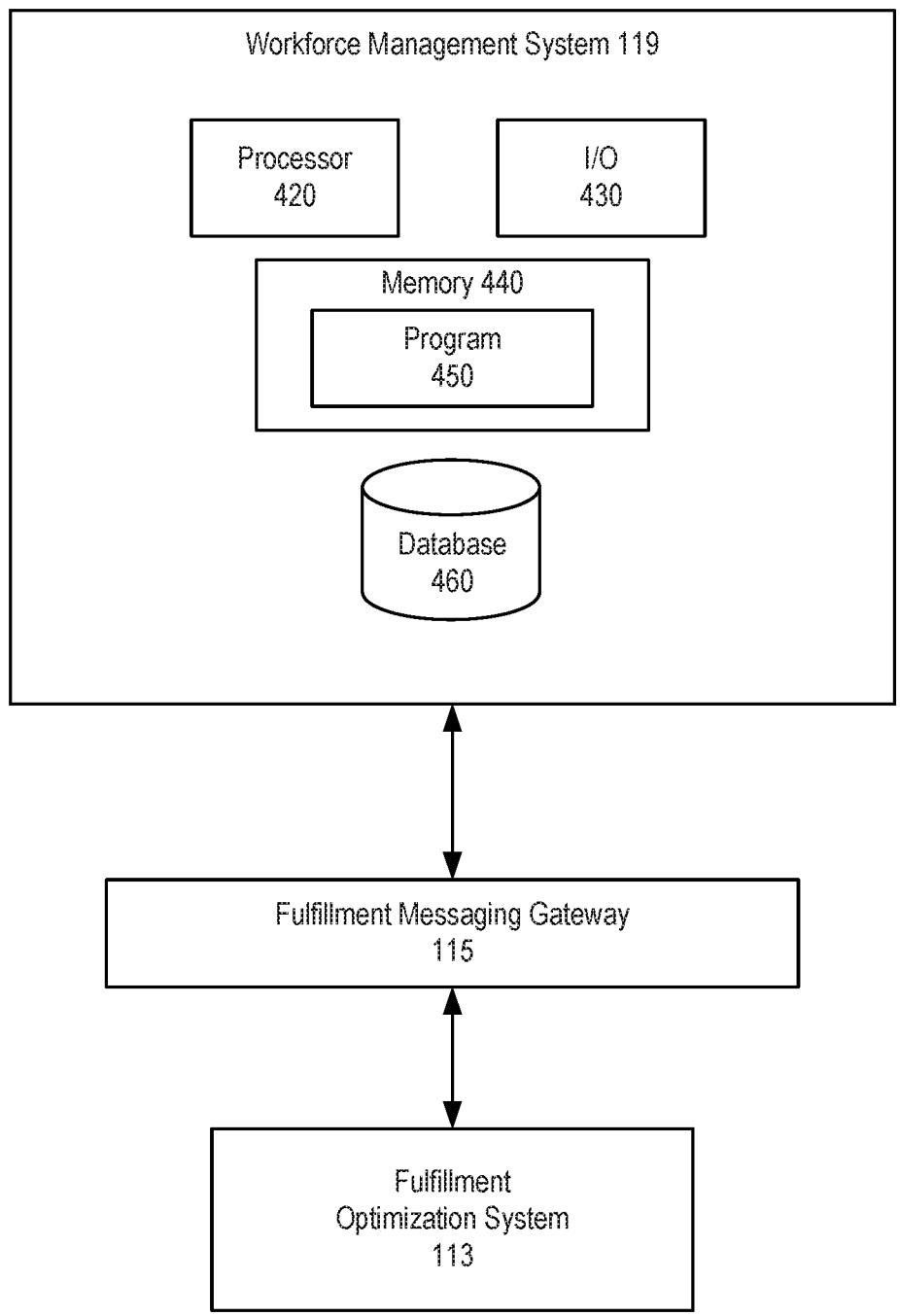
FIG. 4 depicts an exemplary WMS comprising a processor, an input output (I/O) device, a memory and a database and network of devices in communication with WMS, consistent with the disclosed embodiments.

FIG. 4 depicts an exemplary WMS comprising a processor, an I/O device, a memory and a database and network of devices in communication with WMS, consistent with the disclosed embodiments.

As shown, WMS 119 may comprise processor 420, input/output device 430, memory 440 and database 460. WMS 119 may comprise a single computer or may be configured as a distributed computer system including multiple computers that interoperate to perform one or more of the processes and functionalities associated with the disclosed examples.

WMS 119 may include one or more processors 420, an I/O device 430, and a memory 440. Processor 420 may be one or more known processing devices, such as a microprocessor from the Pentium™ family manufactured by Intel™ or the Turion™ family manufactured by AMD™. Processor 420 may constitute a single core or multiple core processor that executes parallel processes simultaneously. For example, processor 420 may use logical processors to simultaneously execute and control multiple processes. Processor 420 may implement virtual machine technologies or other known technologies to provide the ability to execute, control, run, manipulate, store, etc. multiple software processes, applications, programs, etc. In another example, processor 420 may include a multiple-core processor arrangement configured to provide parallel processing functionalities to allow WMS 119 to execute multiple processes simultaneously. One of ordinary skill in the art would understand that other types of processor arrangements could be implemented that provide for the capabilities disclosed herein.

WMS 119 may store information used by processor 420 to perform certain functions related to the disclosed example. In one example, WMS 119 may include memory 440. Memory 440 may store one or more operating systems that perform known operating system functions when executed by processor 420. By way of example, the operating system may include Microsoft Windows, Unix, Linux, Android, Mac OS, iOS, or other types of operating systems. Accordingly, examples of the disclosed invention may operate and function with computer systems running any type of operating system.

Memory 440 may store instructions to enable processor 420 to execute on one or more programs 450, such as workflow management program. Alternatively, or additionally, the instructions and programs 450 may be stored in an external storage in communication with WMS 119 via network or any other suitable network. Memory 440 may be a volatile or non-volatile, magnetic, semiconductor, tape, optical, removable, non-removable, or other type of storage device or tangible computer readable medium.

In one example, memory 440 may be encoded with one or more programs 450. Programs 450 stored in memory 440 may be a workflow management program. Program 450 may cause processor 420 to execute one or more processes related to fulfilling orders to users 260 including, but not limited to, receiving an identifier associated with a batch from mobile device 119B, determining a number of container for fulfilling a batch, displaying the determined number of containers through mobile device 1196, receiving container identifier from user 260. In some embodiments, program 450 may be stored in an external storage device, such as a cloud server located outside of WMS 119, and processor 420 may execute program 450 remotely.

WMS 119 may include at least one database 460. Database 460 may store data store data that may be used by processor 420 for performing methods and processes associated with disclosed examples. Data stored in database 460 may include any suitable data, such as information relating to SKU of items 208, location of items 208 in picking zone 209, and batches including one or more items 208. Although it is not shown in FIG. 4, it is understood that database 460 may be stored in memory 440, a separate storage device in WMS 119, or an external storage device located outside of WMS 119.

At least one of memory 440 and/or database 460 may store data and instructions used to perform one or more features of the disclosed examples. Alternatively, or additionally, or a separate storage device in WMS 119 may store data and instructions used to perform one or more features of the disclosed examples.

At least one of memory 440 and/or database 270 may also include any combination of one or more databases controlled by memory controller devices (e.g., server(s), etc.) or software, such as document management systems, Microsoft SQL databases, SharePoint databases, Oracle™ databases, Sybase™ databases, or other relational databases. WMS 119 may also be communicatively connected to one or more remote memory devices (e.g., databases (not shown)) through network 302 or a different network. The remote memory devices may be configured to store information and may be accessed and/or managed by WMS 119. Systems and methods consistent with disclosed examples, however, are not limited to separate databases or even to the use of a database.

WMS 119 may also include at least one I/O device 430 that may comprise one or more interfaces for receiving signals or input from devices and providing signals or output to one or more devices that allow data to be received and/or transmitted by WMS 119. For example, WMS 119 may include interface components, which may provide interfaces to one or more input devices, such as one or more keyboards, mouse devices, and the like, which may enable WMS 119 to receive input from user device 119A-119C. In one embodiment, the input may be scanned information from a mobile device 119B.

WMS 119 may communicate with other systems in FIG. 1A. In some embodiments, consistent with disclosed figures, WMS 119 may communicate with FO system 113 via FMG 115. For example, WMS may receive customer order information from FO system 113 and process the information to assign picking operations to user 260 as a batch. WMS 119 may also receive from FO system 113 where items are held or stored in a warehouse. Based on the received information about item locations, WMS 119 may determine the route of a picking operation when a batch include more than one item.

Figure 5:
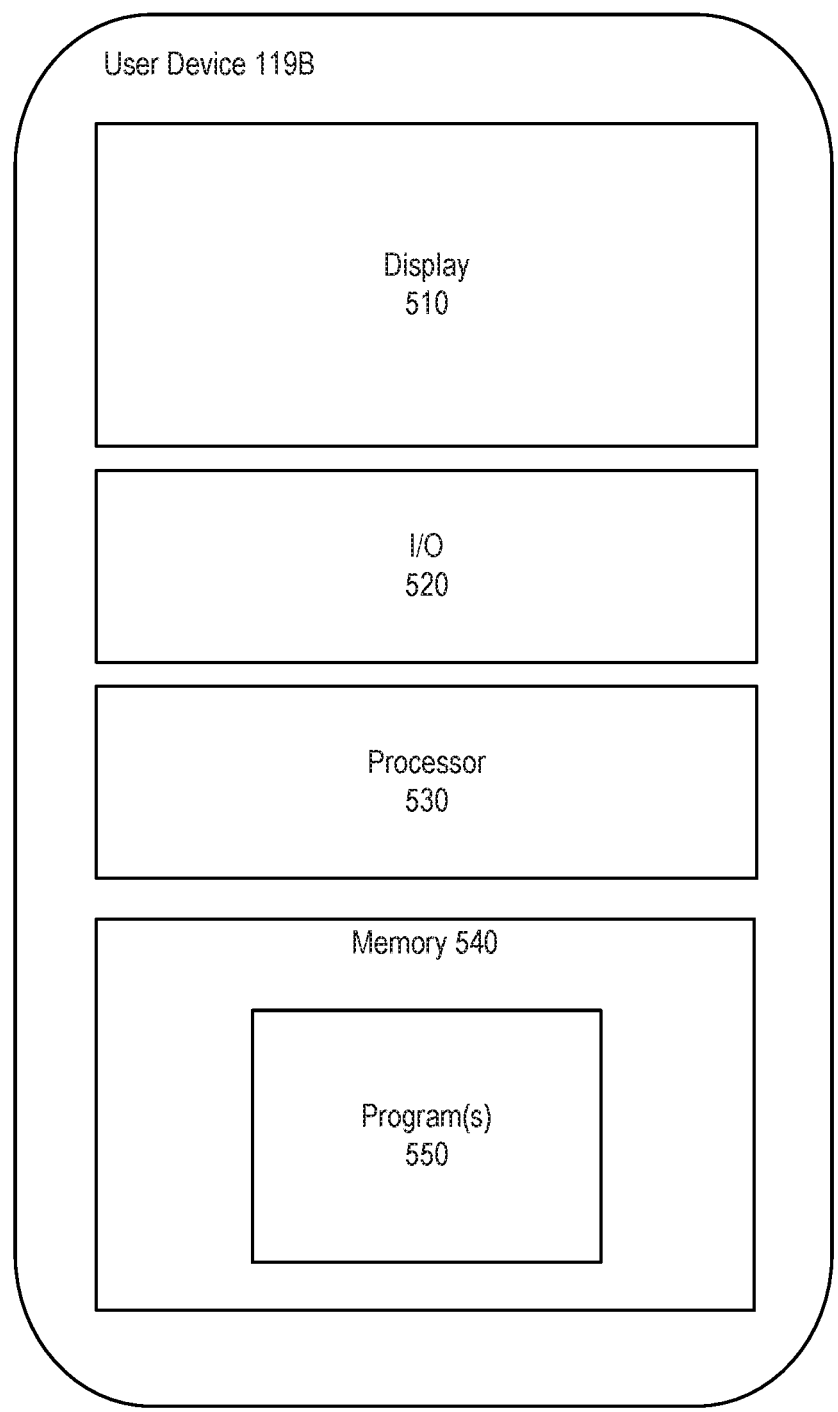
FIG. 5 is an exemplary user device, consistent with the disclosed embodiments.

FIG. 5 shows an exemplary configuration of mobile device 119B, consistent with disclosed examples. Mobile device 119B may comprise display 510, I/O device 520, processor 530, and memory 540. While FIG. 5 depicts mobile device 119B, one of skill in the art will understand that other devices may be implemented in a similar manner (e.g., tablet 119A or computer 119C).

Mobile device 119B may be configured with storage that stores one or more operating systems that perform known operating system functions when executed by one or more processors. By way of example, the operating systems may include Microsoft Windows™, Unix™, Linux™, Android™, Apple™ Mac OS, iOS, or other types of operating systems. Accordingly, examples of the disclosed invention may operate and function with computer systems running any type of operating system. Mobile device 119B may also include communication software that, when executed by a processor, provides communications with network, such as Web browser software, tablet or smart hand-held device networking software, etc.

Mobile device 119B may include a display 510. Display 510 may include, for example, liquid crystal displays (LCD), light emitting diode screens (LED), organic light emitting diode screens (OLED), a touch screen, and other known display devices. Display 510 may display various information. For example, display 510 may display how many containers and carts are necessary for a batch. Display 510 may display touchable or selectable options for a user to select and may receive user selection of options through a touch screen or I/O device 520.

I/O devices 520 may include one or more devices that allow mobile device 1196 to send and receive information from a user or another device. I/O devices 520 may include various input/output devices, such as a scanner, a camera, a keyboard, a mouse-type device, a gesture sensor, an action sensor, a physical button, an oratory input, etc. I/O devices 520 may also include one or more communication modules (not shown) for sending and receiving information from other components in WMS 119 by, for example, establishing wired or wireless connectivity between mobile device 1196 and network 302, by establishing direct wired or wireless connections between mobile device 1196 and WMS 119.

Mobile device 119B may include at least one processor 530, which may be one or more known computing processors, such as those described with respect to processor 420 in FIG. 4. Processor 530 may execute various instructions stored in mobile device 119B to perform various functions, for example, processing information related to item 208 or container 230 received from I/O device 520.

Mobile device 119B may include a memory 540, which may be a volatile or non-volatile, magnetic, semiconductor, tape, optical, removable, non-removable, or other type of storage device or tangible (i.e., non-transitory) computer-readable medium. Memory 540 may store one or more programs 550. Programs 550 may include operating systems (not shown) that perform known operating system functions when executed by one or more processors. Disclosed examples may operate and function with computer systems running any type of operating system.

Programs 550 may be a workflow management program. The workflow management program may control a picking operation in a fulfillment center by providing instructions to workers. Similar to program 450 executed by WMS 119, program 550 may be executed by processor 530 to perform processes related to fulfilling batches, including, but not limited to, receiving an identifier associated with a batch from mobile device 119B, displaying the determined number of containers through mobile devices 119B, receiving a container identifier from user device, and retrieving a list of one or more items associated with a batch.

Figure 6A:
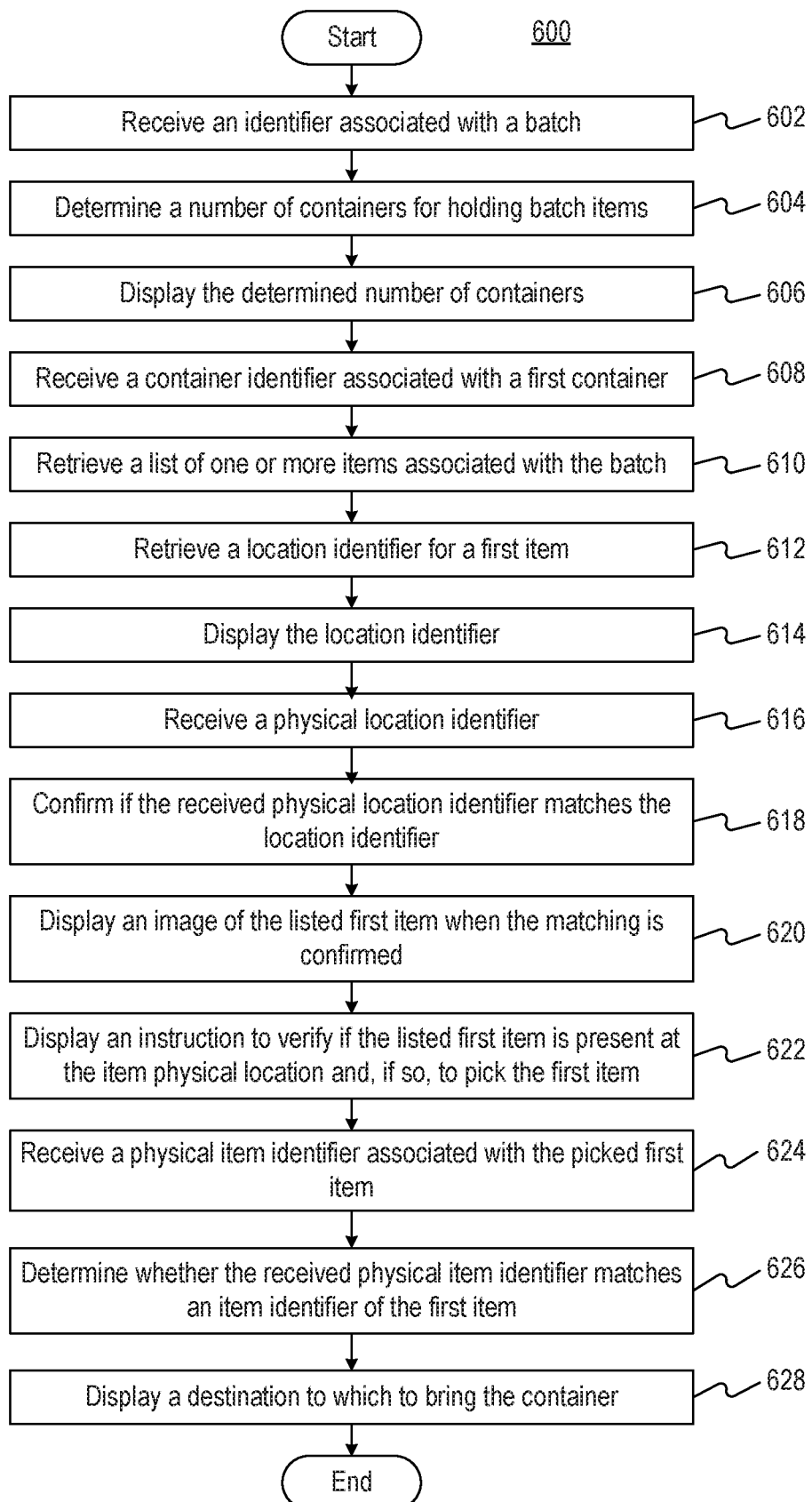
FIG. 6A is a flowchart of an exemplary method for fulfilling a batch, consistent with the disclosed embodiments.

FIG. 6A is a flowchart of an exemplary method for fulfilling a batch, consistent with the disclosed embodiments. For discussion purposes, the exemplary steps of method 600 are described as performed by WMS 119. In some embodiments, however, one or more steps may be performed by user device 119A-119C. In some embodiments, different components of WMS 119 may perform various steps of the methods in a distributed-computing configuration.

At step 602, WMS 119 may assign a batch to a user (e.g., user 260 in FIG. 2C). Before the assignment, a user 260 may log in to program 550, such as a workflow management program using a mobile device 119B. The workflow management program may control picking operations in a fulfillment center by providing instructions to users (FIG. 8A described below provides an exemplary illustration of step 602). User devices 119A-119C, such as a mobile device 119B, may display to user 260, such as a worker, batch assignment options. User 260 may choose a manual assignment option. In this case, user 260 may provide a particular batch identifier using I/O device 520 of user devices 119A-119C. Alternatively, if user 260 chooses an automatic assignment option, WMS 119 may assign a batch to user 260. WMS 119 may assign a batch based on Promised Delivery Dates (PDD) associated with available batches. Specifically, a batch with earlier PDD may be assigned earlier than a batch with later PDD.

Once a batch is assigned to user 260, as shown at step 604, WMS 119 may determine a number of containers and/or carts for fulfilling the batch. Determining the number of containers and/or carts may comprise considering one or more of SKU or volume information associate with items 208 in the assigned batch. Based on SKU and/or volume information stored in, for example Database 460, WMS 119 may calculate how many containers and carts would be eventually be needed to fulfill the assigned batch. In some embodiments, a number of containers may be calculated using a ratio of container usage as explained above. At step 606, WMS 119 may display the determined number of containers and/or carts via user devices 119A-119C, such as mobile device 119B (FIG. 8B described below provides an exemplary illustration of step 606). In some embodiments, the number of containers and/or carts may be displayed as words. Alternatively, or additionally, the number of containers and/or carts may be displayed as an image. In some embodiments, containers 230 may be various in size. In this case, size information may also be displayed via user devices 119A-119C.

Step 606 may comprise calculating the number of containers for a batch using known data. For example, in some embodiments, WMS 119 may First, a value $vf_{avgcontainer}$ container representing an average container fill may be calculated using the following formula.

$$vf_{avgcontainer} = v_{avgcontainer} \times \frac{usage_{avgcontainer}}{100}$$

WMS 119 may determine the $v_{avgcontainer}$ value in the above formula by determining an average volume of all containers that are used in a particular fulfillment center (FC) 200. For example, if workers in FC 200 move items using two different sizes of containers, and FC 200 has equal numbers of each size of containers, $v_{avgcontainer}$ may be the average of the two sizes. The $usage_{avgcontainer}$ value in the above formula may represent a calculated, stored, static, dynamic, or otherwise determined value that indicates the average fill ratio of each container in an FC. In some embodiments, this value may be determined by analyzing historical data, while in other embodiments it may be a certain set value. For example, WMS 119 may calculate the average fill rate for each container, by determining the volume of each item in each container (e.g., by performing lookups in a database), determining the volume of all items in the container, and determining a proportion of fill based on the volume of all items and the container volume (e.g., total volume of all items divided by the container volume).

WMS 119 may then determine the number of containers $n_{containers}$ for a particular batch having m items by adding up the volume of each item in the batch and dividing it by the $vf_{avgcontainer}$ value:

$$n_{Containers} = \frac{\sum_{i=0}^{m} v_m}{vf_{avgcontainer}}$$

At step 608, WMS 119 may receive a container identifier associated with a first container through I/O device of user devices 119A-119C. (FIG. 8C described below provides an exemplary illustration of step 608.) In some embodiments, user 260 may provide container identifier 270 physically attached to the container to WMS 119. Container identifier 270 may comprise one or more of an item barcode, RFID tag, a matrix barcode, such as Quick Response (QR) code, or the like. In some embodiments, user 260 may scan the barcode using mobile device 119B. For example, mobile device 119B can use its camera to scan the barcode and transmit the scanned image to WMS 119 via wireless or wired network.

As shown at step 610, WMS 119 may retrieve a list of one or more items associated with the assigned batch. WMS 119 may perform step 610 at any time after the batch assignment. For example, step 610 may be performed earlier than 604, 606 or 608 despite the illustration in FIG. 6A. When there are multiple items in the batch job, WMS 119 may determine in which order items 208 should be picked. For example, the determined order may provide the shortest route to user 260.

Based on the determination, at step 612, WMS 119 retrieves a location identifier for a first item to be picked. The location identifier retrieved by WMS 119 may be provided from FO system 113. Similar to step 610, step 612 may be performed any time after the batch assignment. WMS 119 then, as shown at step 614, may provide user 260 a location identifier of the first item to be picked via user devices 119A-119C. (FIG. 8D described below provides an exemplary illustration of step 614.) In some embodiments, the instruction may be provided using display, voice, text, or any combination thereof. User 260 may physically move to the designated location, which location identifier indicates, and scan physical location identifier found at the designated location. User device 119A-119C, such as mobile device 119B, may assist users 260 to find the designated location, for example, using a map with navigation, voice, or vibration, as explained above.

At step 616, WMS 119 may receive physical location identifier 240 through I/O device 520 of user devices 119A-119C. As explained above, physical location identifier 240 may be attached on storage units 210 to indicate its unique location in a warehouse. In some embodiments, mobile device 119B may scan physical location identifier 240 using I/O device 520, such as an imaging device including a camera or a scanner. Mobile device 119B may send the scanned information to WMS 119.

At step 618, WMS 119 may determine if received physical location identifier 240 matches location identifier of the first item. (FIG. 6B described below provides an exemplary illustration of step 618.)

If WMS 119 determines that the received physical location identifier 240 does not match the displayed location identifier, user device 119A-119C may display a message that instructs user 260 to scan a different location identifier. In some embodiments, mobile device 119B may show a map with directions to the designated location based on information of the scanned identifier. In some embodiments, mobile device 119B may provide a sound or a text message to assist user 260 to find the location identifier of item 208 that needs to be picked. mobile device 119B may continually display error messages until user 260 scans physical location identifier 240 that matches the displayed location identifier.

When WMS 119 confirms that received physical location identifier 240 matches the location identifier, then at step 620, user device 119A-119C may display to user 260 a first item to be picked. (FIG. 8E described below provides an exemplary illustration of step 620.) The first item may be displayed as a photo and/or name of the item. The display may accompany the item's volume and/or weight to assist user 260 to determine if an item stored on the designated location is the listed item to be picked.

At step 622, WMS 119 may display to user 260 an instruction to verify if the listed first item is present at the designated location. If there is no item at the designated location or the number of the item is in shortage, user 260 may report error via I/O device 520 of user device 119A-119C. When user 260, such as worker, finds the listed first item at the designated location, user 260 may move the first item 208 into container 230.

At step 624, mobile device 1196 may provide physical item identifier 250 to WMS 119. Physical item identifier 250 may comprise one or more of an item barcode, RFID tag, a matrix barcode, such as Quick Response (QR) code, or the like. Using mobile device 1196, user 260 may provide WMS 119 physical item identifier 250 by scanning the barcode attached to the item. If physical item identifier 250 is damaged, user 260 may report the damage via I/O device 520 of user device 119A-119C.

At step 626, WMS 119 may determine whether received physical item identifier 250 matches the displayed item identifier of the first item. Step 626 may be similar to step 618 where WMS 119 confirms whether the received physical location identifier matches the location identifier. In some embodiments, at step 626, if WMS 119 determines that the received physical item identifier 250 does not match the displayed item identifier, user device 119A-119C may display a message that instructs user 260 to scan a different physical item identifier. user device 119A-119C may continually display error messages until user 260 scans physical item identifier 250 that matches the displayed item identifier. After picking is complete, at step 628, user device 119A-119C may display a destination location for user 260 where to move the containers with picked items.

Figure 6B:
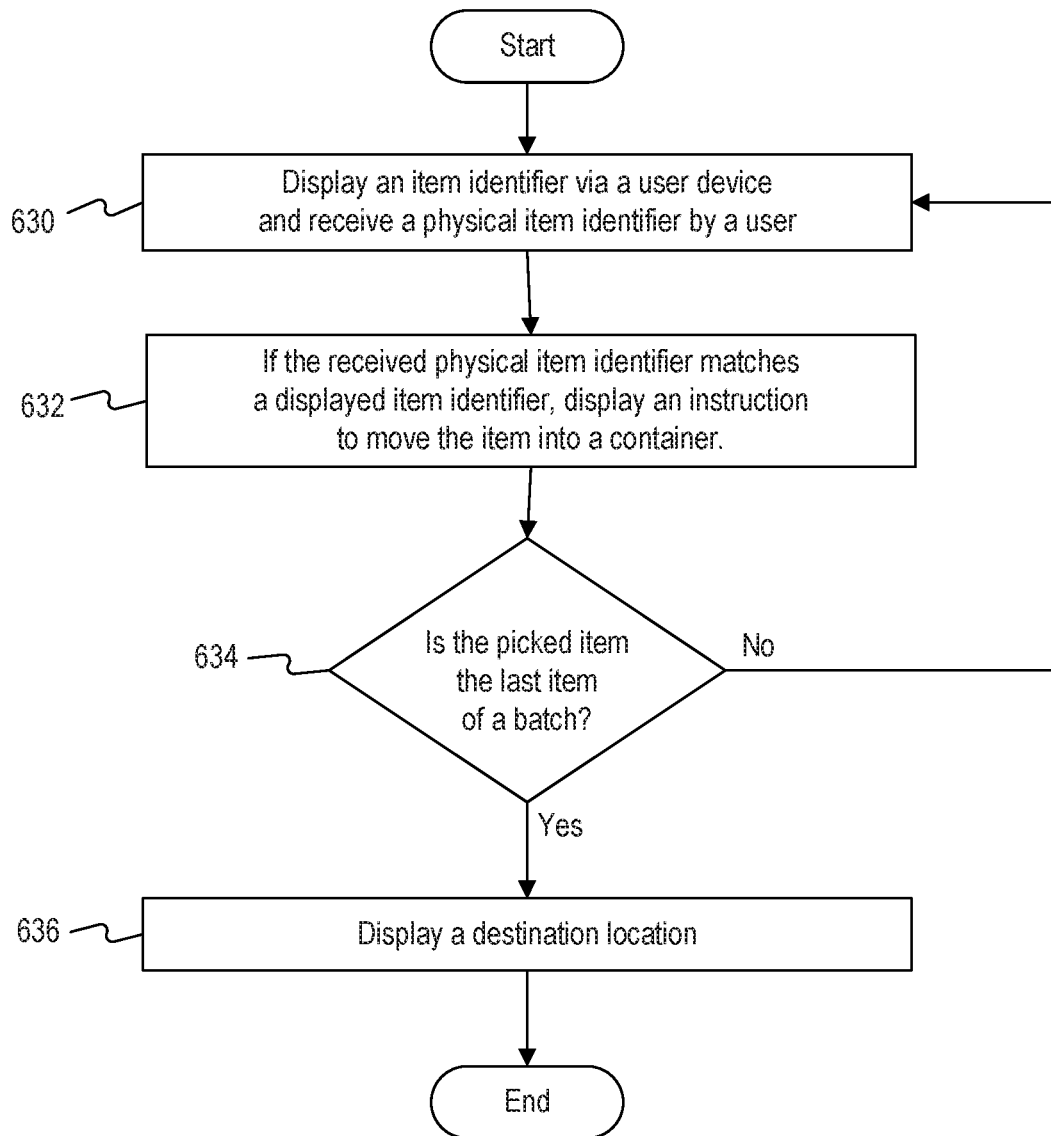
FIG. 6B is a flowchart depicting an exemplary method when a batch includes more than one items, consistent with the disclosed embodiments.

FIG. 6B depicts an exemplary method when a batch includes more than one item, consistent with the disclosed embodiments. If the batch has more than one item, WMS 119 may repeat the steps in FIG. 6A. Specifically, at step 630, WMS 119 may retrieve an item identifier of the second item and display the item identifier to user 260. Then, user 260 may scan physical item identifier 250 of the second item. At step 632, WMS 119 may confirm whether received physical item identifier 250 matches the item identifier. After confirming the matching, user device 119A-119C may display an instruction to move the second item into container 230. At step 634, WMS 119 determines if the picked item is the last item of the batch. If the picked item is not the last item, the previous steps will repeat.

But, if the picked item is the last item of the batch, at step 636, mobile device 119B may display a destination location via user devices 119A-119C and complete the batch. In some embodiments, WMS 119 may further instruct user 260 to scan a physical destination identifier. User 260 may move the container to the designated destination and scan the physical destination identifier. WMS 119 may receive the physical destination identifier, then determine that the batch is completed. WMS 119 may share completed batch information with other systems shown in FIG. 1, such as FO system 113.

Figure 7A:
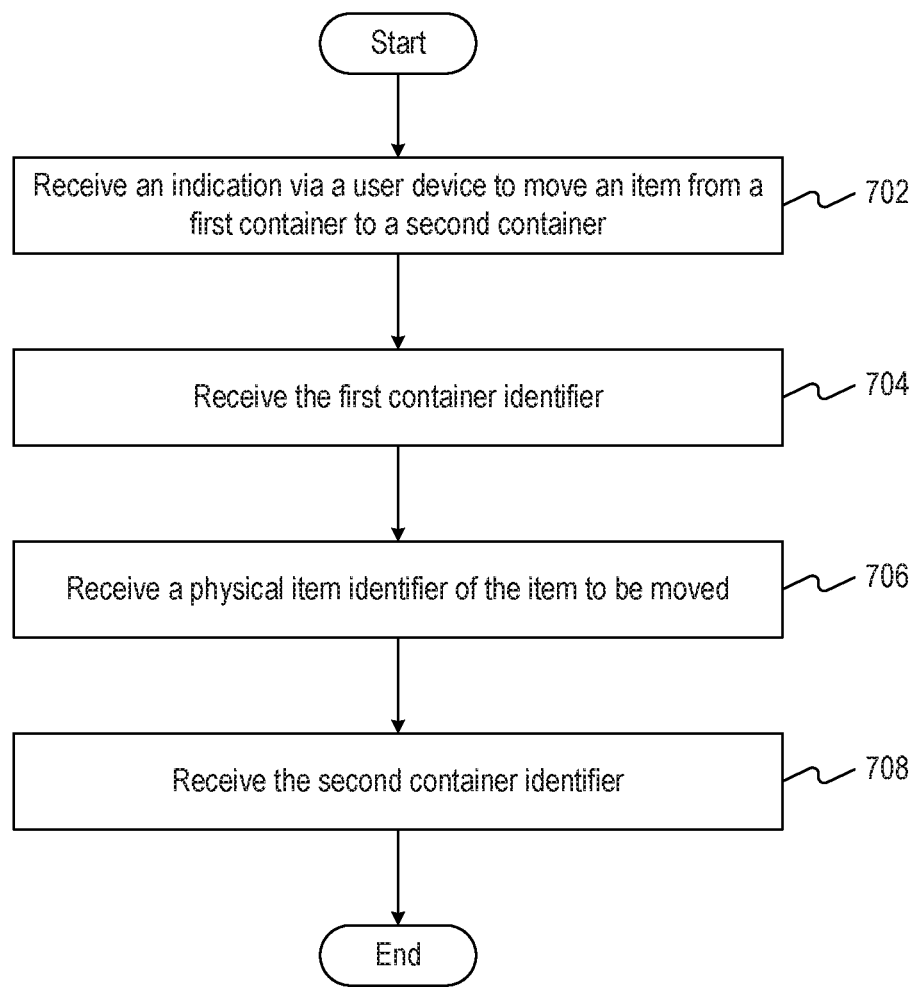
FIG. 7A is a flowchart depicting an exemplary method for moving an item to a different container consistent with the disclosed embodiments.

FIG. 7A depicts an exemplary method showing how user 260 may move an item from one container to another container. User device 119A-119C may include an option for user 260 to indicate that user 260 wants to move an item. In some embodiments, there may be a selectable option in mobile device 119B for a user to indicate a desire to move an already-picked item from one container to a different container. At step 702, WMS 119 may receive an indication via user device that user 260 wants to move an already picked item from a first container to a second container. At step 704, WMS 119 may receive the container identifier of the first container which holds the item. At step 706, WMS 119 may then receive physical item identifier 250 of the item that user 260 want to move to the second container. At step 708, WMS 119 subsequently receive the container identifier of the second container where user 260 wants to move the item to. After those steps, the item will be moved from the first container to the second container.

Figure 7B:
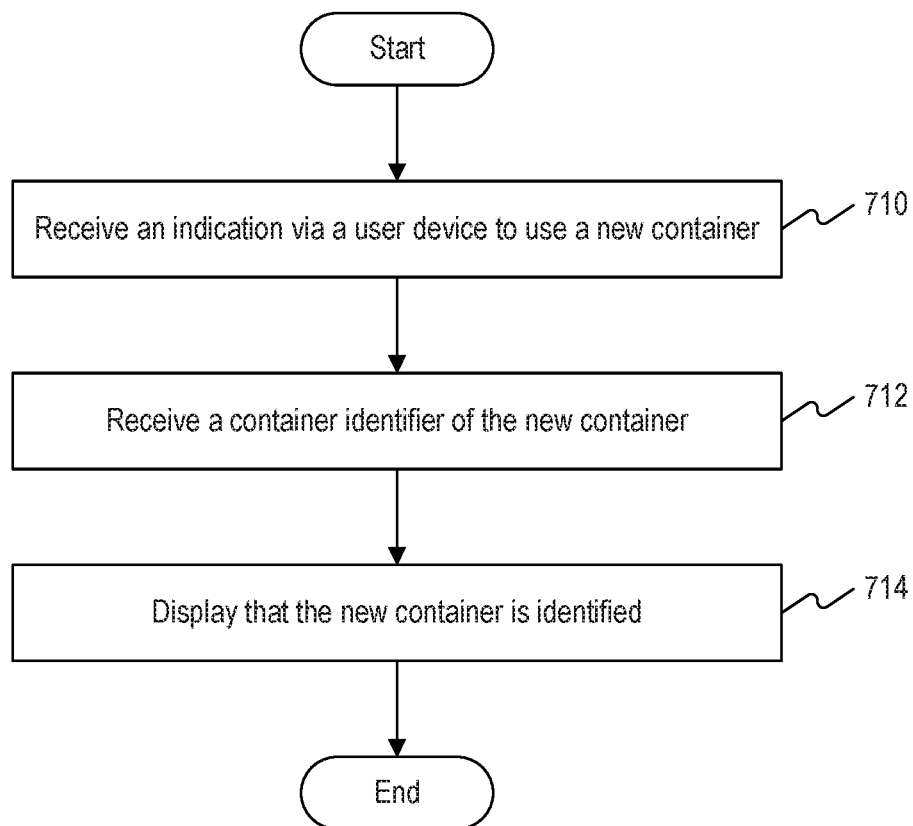
FIG. 7B is a flowchart depicting an exemplary method for changing a container to use consistent with the disclosed embodiments.

FIG. 7B depicts an exemplary method showing how user 260 may change which container stores one or more items. User device 119A-119C may include an option for user 260 to indicate that user 260 wants to use a different container, for example, because a container that worker is using is full. In some embodiments, there may be a selectable option in mobile device 119B that a worker can provide input when user 260 wants to use a different container. At step 710, WMS 119 may receive an indication via user device that user 260 wants to use a different container. At step 712, WMS 119 subsequently may receive a container identifier of the different container. At step 714, mobile device 1196 may display an indication of the different container is identified. After the identification, user 260 may use the newly identified container.

Figure 8A:
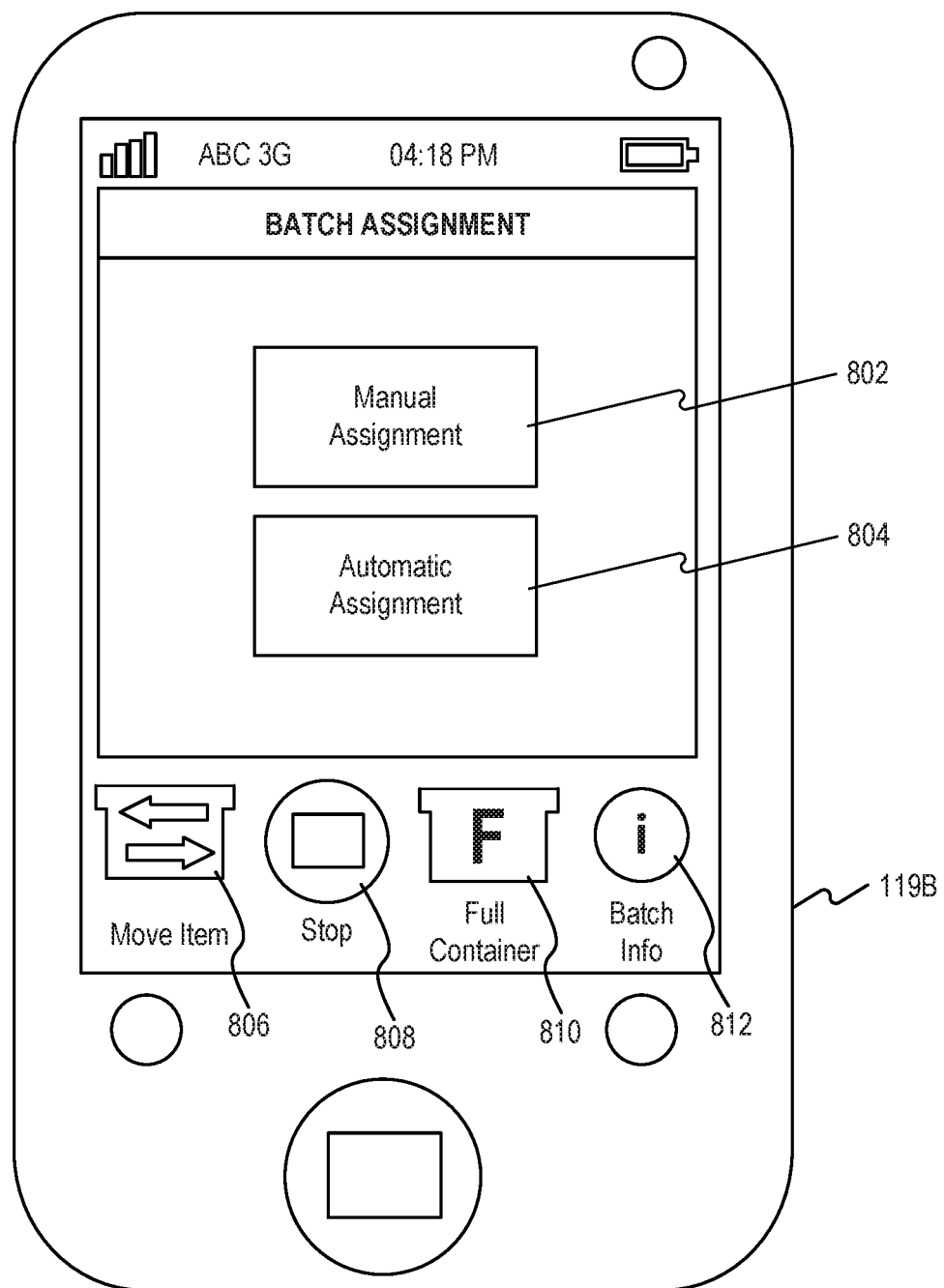
FIG. 8A-H illustrate exemplary display on user devices, consistent with the disclosed embodiments.

FIG. 8A depicts an exemplary display of batch assignment on mobile device 119B, corresponding to step 602 in FIG. 6A. To assign a batch to user 260, such as a worker in FC 200, mobile device 1196 may display selectable options including manual assignment 802 and automatic assignment 804. In some embodiments, those options can be pushed or touched by user 260 to provide input to WMS 119. As explained above, when user 260 chooses manual assignment 802, user 260 may subsequently provide a particular batch identifier using I/O device 520 of mobile device 119B. Alternatively, if user 260 chooses an automatic assignment option, WMS 119 may assign a batch to a worker.

Consistent with the illustration in FIG. 8A, mobile device 119B may display other selectable options, such as, move item 806, stop 808, full container 810, batch info 812. These options may be displayed and selected any time during a picking operation. In some embodiments, move item option 806 may be selected by user 260, when user 260 wants to move an item from one container to another container. When WMS 119 receives an input of move item 806, steps depicted in FIG. 7A may be followed.

In some embodiments, stop option 808 may be selected by user 260, when user 260 wants to stop working on the assigned batch. Upon a worker's input of stop 808, WMS 119 may receive information that the batch is stopped and marked incomplete. The incomplete batch may be subsequently assigned to the same user or a different user, and the assigned user may complete the batch.

In some embodiments, full container 810 may be selected by user 260, when user 260 wants to use a different container. When WMS 119 receives an input of full container 810, steps depicted in FIG. 7B may be followed.

In some embodiments, batch info option 812 may be selected by user 260, when user 260 wants to see more information about the assigned batch. Upon a worker's input of batch info 812, mobile device 119B may display information of an assigned batch, including, but not limited to, all items in the batch and/or physical location of the items.

Figure 8B:
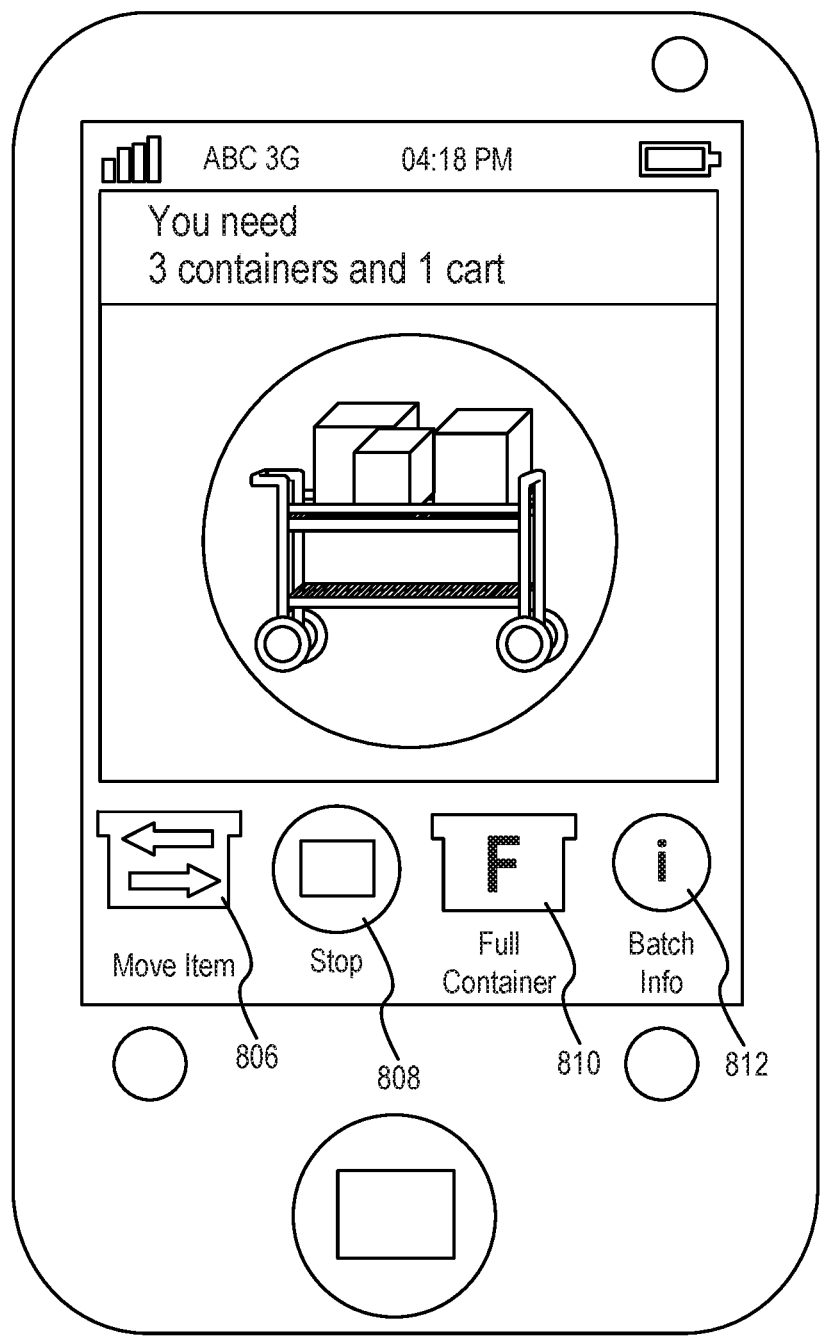

FIG. 8B illustrates an exemplary display of number of containers and/or carts on mobile device 119B, corresponding to step 606 in FIG. 6A. As explained above, in some embodiments, the number of containers and/or carts may be displayed as words. Alternatively, or additionally, the number of containers and/or carts may be displayed as an image. Mobile device 119B may display other selectable options, such as, move item 806, stop 808, full container 810, batch info 812. These options may be displayed and selected at any time during a picking operation.

Figure 8C:
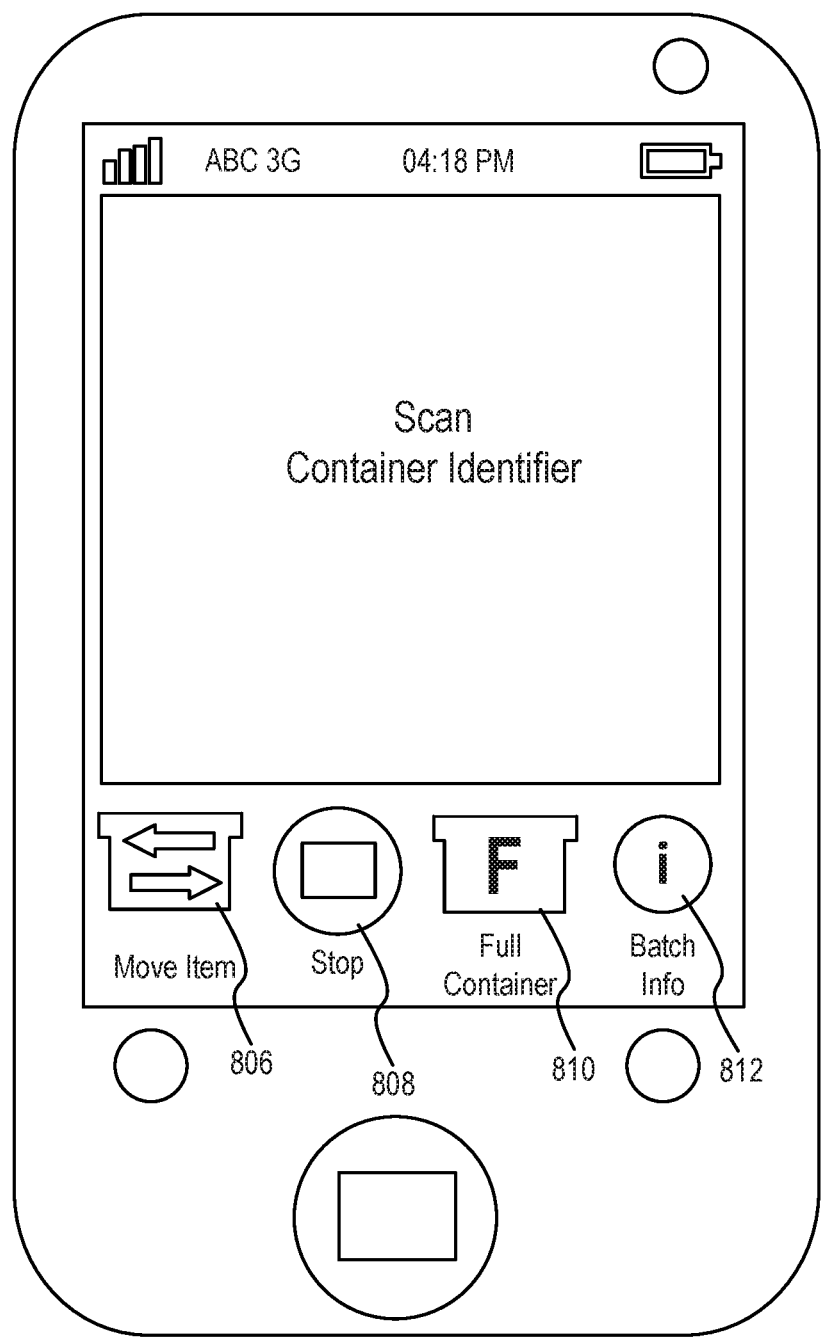

FIG. 8C illustrates an exemplary display of an instruction to scan container identifier on mobile device 119B. In accordance with this instruction, user 260 may provide input of container identifier 270. In some embodiments, container identifier 270 may be attached to container 230. Container identifier 270 may comprise one or more of an item barcode, RFID tag, a matrix barcode, such as Quick Response (QR) code, or the like. Mobile device 119B may display other selectable options, such as, move item 806, stop 808, full container 810, batch info 812. These options may be displayed and selected at any time during a picking operation.

Figure 8D:
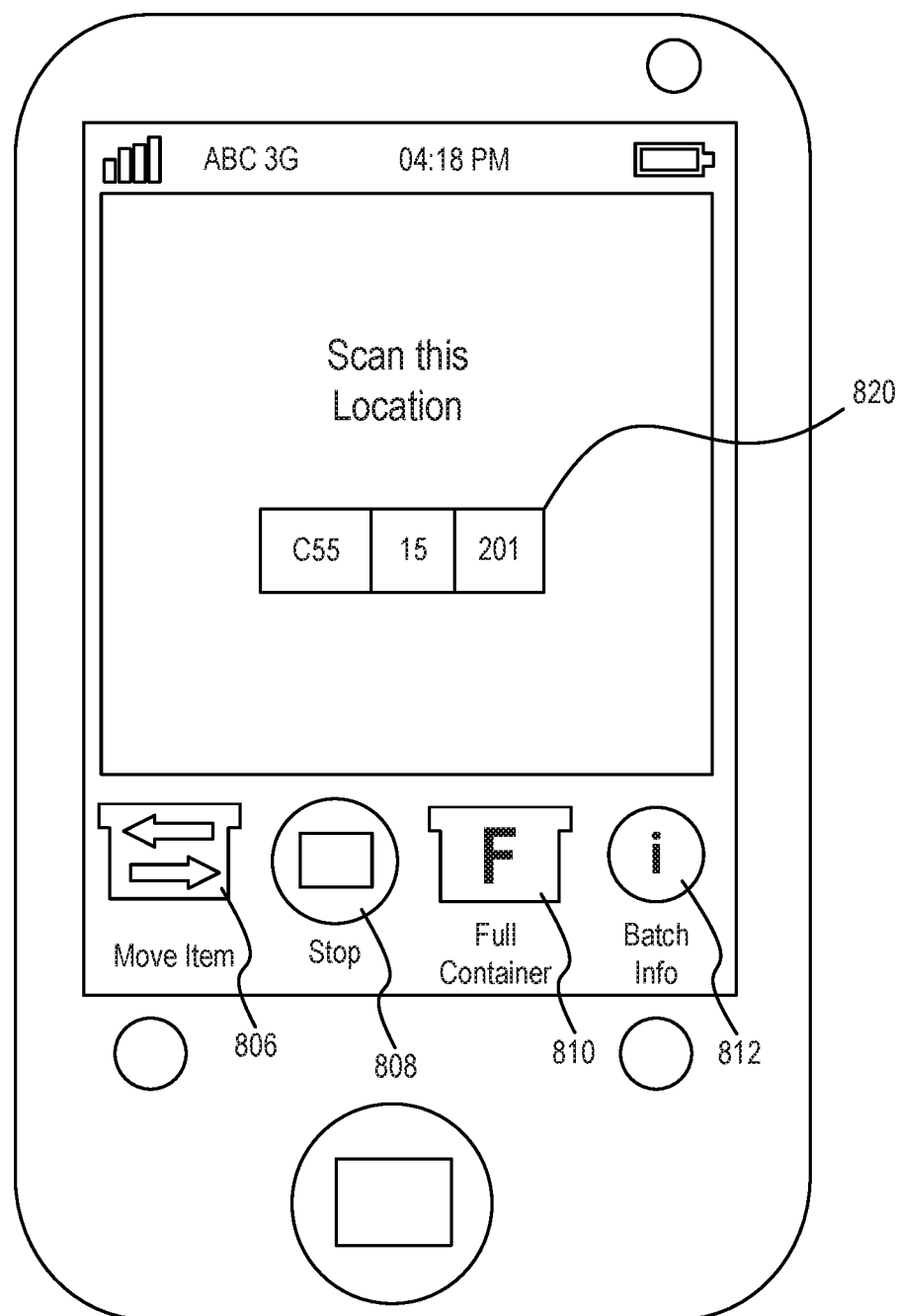

FIG. 8D illustrates an exemplary display of location identifier 820 on mobile device 1196. As explained above, user 260 may find a designated location indicated by location identifier 820. As explained above, user 260 may move to the designated location on foot. In some embodiments, users may use other devices that assist movement such as a scooter, a robot and/or vehicles.

In accordance with this instruction, user 260 may provide input of physical location identifier 240, for example, by scanning or typing. In some embodiments, physical location identifier 240 may be attached to storage units 210. Container identifier 270 may comprise one or more of an item barcode, RFID tag, a matrix barcode, such as Quick Response (QR) code, or the like. WMS 119 may display other selectable options, such as, move item 806, stop 808, full container 810, batch info 812. These options may be displayed and selected any time during a picking operation.

Figure 8E:
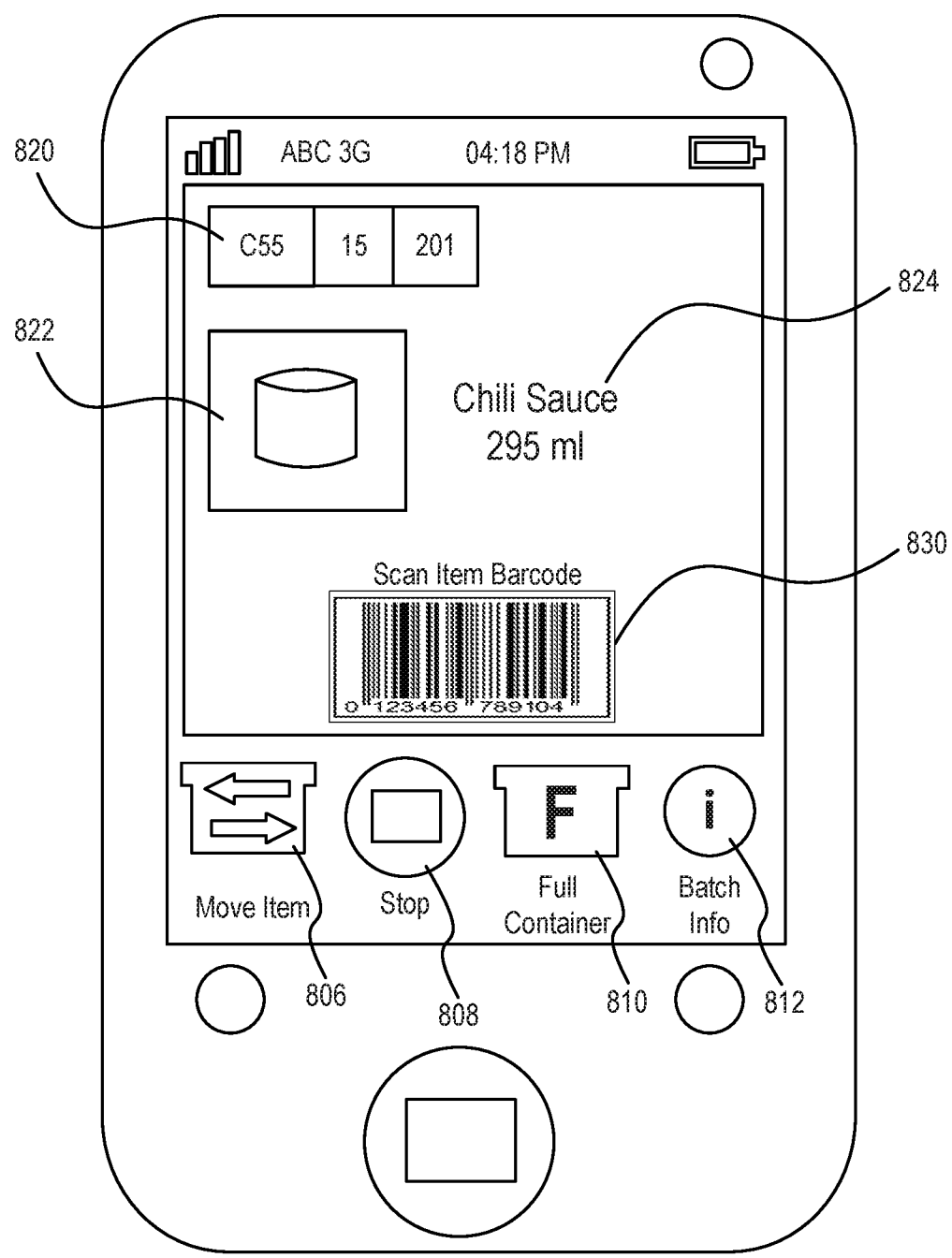

FIG. 8E illustrates an exemplary display of an item 208 that needs to be picked on mobile device 1196. When WMS 119 confirms that received physical location identifier 240 matches location identifier 820, mobile device 1196 may display to user 260 an item to be picked. The item may be displayed as item photo 822 and/or item information 824. Mobile device 1196 may display the item's volume and/or weight to assist user 260 to determine if an item stored at the designated location is the listed item to be picked. Mobile device 1196 may display item identifier 830 with item name 824 and/or item photo 822. In some embodiments, mobile device 119B may also display location identifier 820 to assist user 260 to find the listed item.

In accordance with this instruction, user 260 may input physical item identifier 250, for example, by scanning or typing. In some embodiments, physical item identifier 250 may be attached to item 208. Physical item identifier 250 may comprise one or more of an item barcode, RFID tag, a matrix barcode, such as Quick Response (QR) code, or the like. When physical item identifier 250 matches item identifier 830, user 260 may move the item into container 230. Mobile device 119B may display other selectable options, such as, move item 806, stop 808, full container 810, batch info 812. These options may be displayed and selected any time during a picking operation.

Figure 8F:
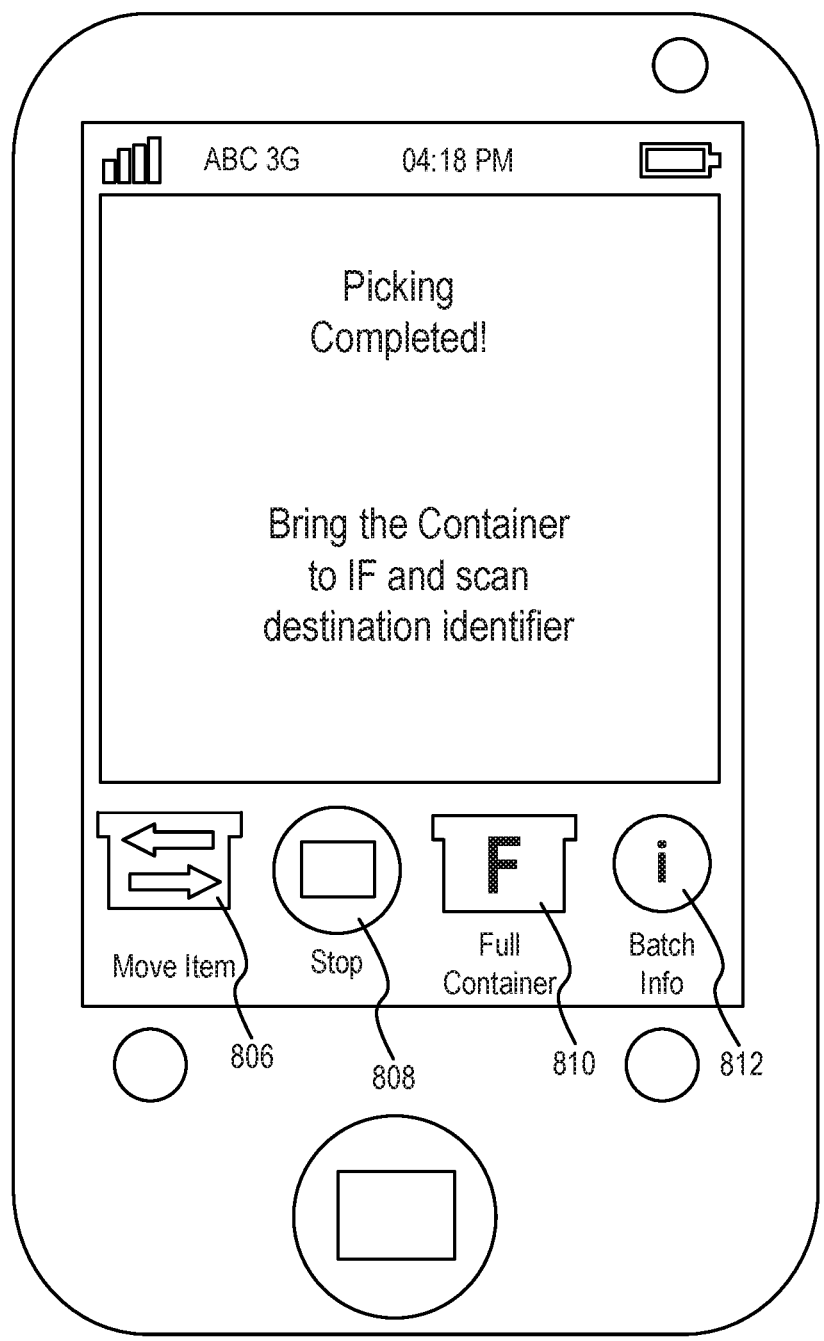

When every item in the batch is picked (e.g., as described above with respect to step 634), mobile device 1196 may display a destination location in accordance with FIG. 8F. User 260 may move container 230 with picked items to the designated destination location. User 260 may provide input of physical destination identifier located at the designated destination location. Mobile device 1196 may display other selectable options, such as, move item 806, stop 808, full container 810, batch info 812. These options may be displayed and selected any time during a picking operation.

Figure 8G:
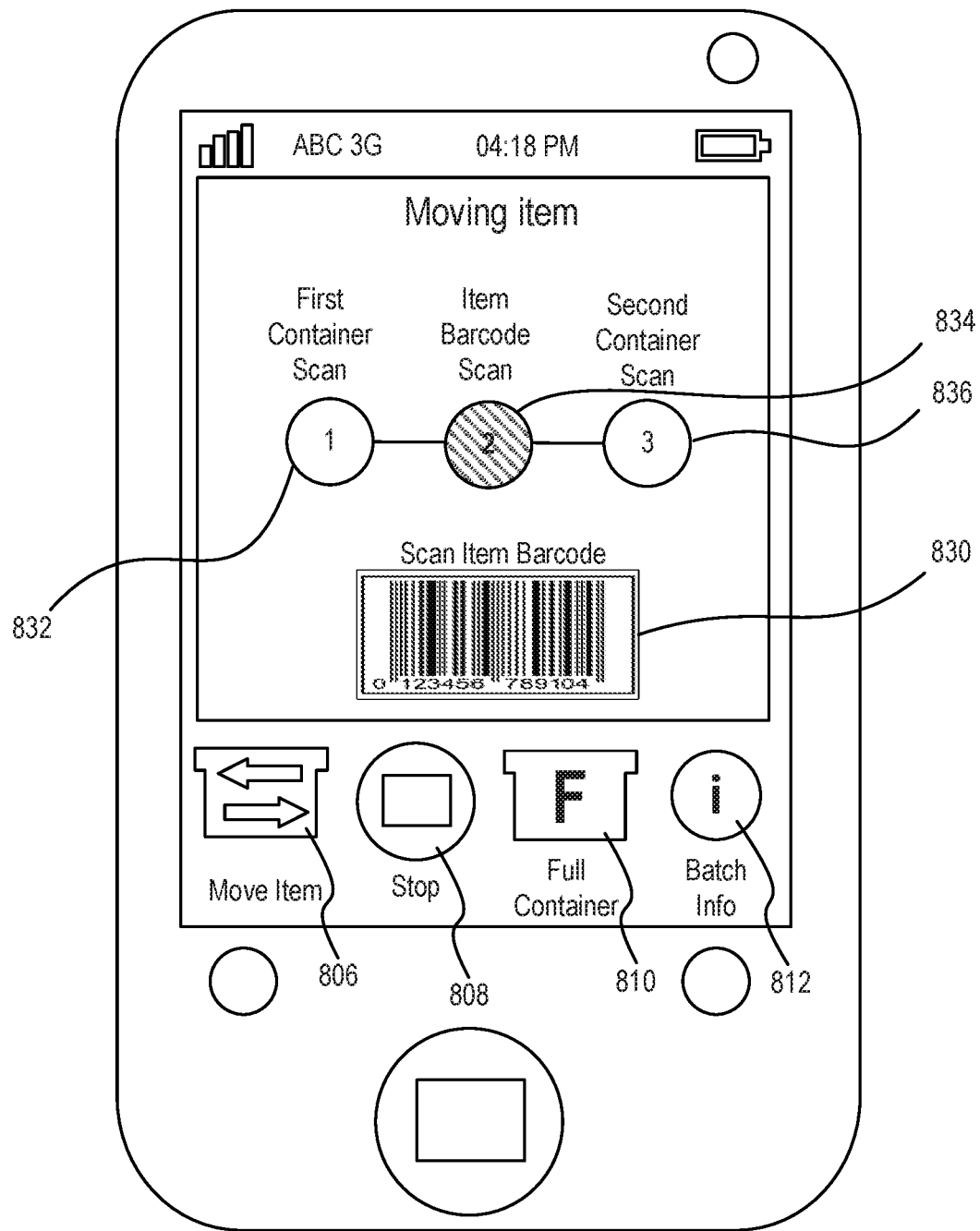

Consistent with an exemplary illustration in FIG. 8G and a flowchart in FIG. 7A, an already picked item may be moved from a first container to a second container by following steps.

As shown in FIG. 8G, each step may be displayed visually, via mobile device 119B. For example, first circle 832 may represent a step that a worker scans the first container already containing item 208. Each step may be signaled in a way that assists a worker to identify the step. For example, first circle 832 may be colored or flashing to indicate the first step. At the step of first circle 832, a worker may scan a first container. After the first container identifier is provided, second circle 834 may be signaled. For example, second circle 834 may be colored or flashing to indicate the second step. In accordance with the instruction, a worker may scan an item identifier of the item to move. After the item identifier is provided, third circle 836 may be signaled. Third circle 836 may be colored or flashing to indicate the third step. At the third step, a worker may scan the second container. By following those steps, a worker may physically move the scanned item from the first container to the second container.

Figure 8H:
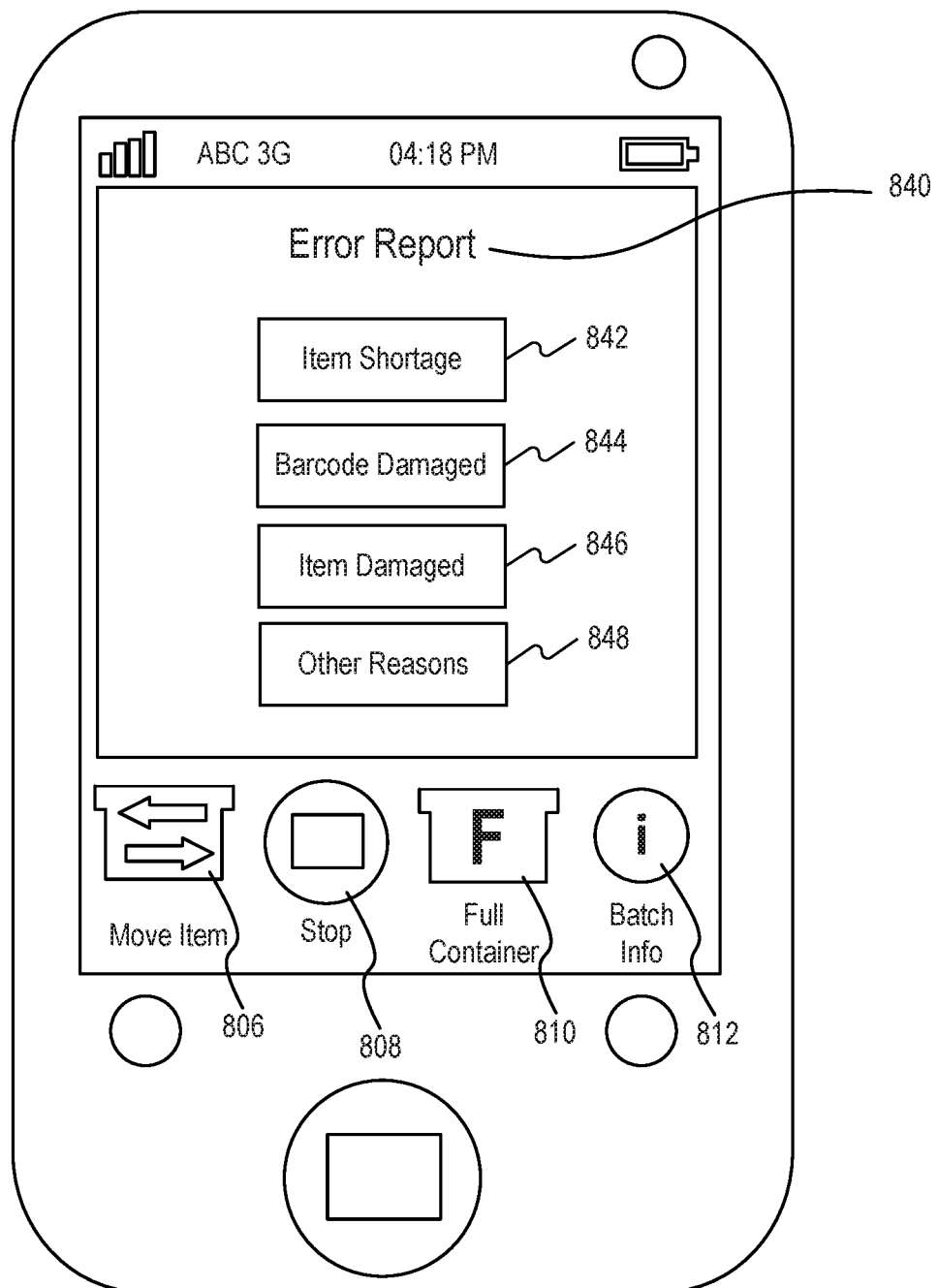

FIG. 8H is an exemplary illustration of reporting errors. User 260, such as a worker, may indicate that the worker wants to report error using I/O device 520 of user device 119A-119C anytime during a picking operation. In some embodiments, mobile device 119B may display selectable options indicating particular errors. In some embodiments, errors to report may include, but not limited to, item shortage 842, barcode damage 844, item damaged 846, or any other reasons 848. When WMS 119 receives any error reports 840, it may communicate with other systems, such as FO system 113, in a fulfillment center to solve the reported issue.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system, comprising:
   at least one processor;
   at least one memory storing instructions, wherein the instructions cause the at least one processor to:
     send, to a user device for display, a map illustrating a physical location associated with a first item;
     send, to the user device for display, at least one of an image of the first item, a volume of the first item, or a weight of the first item;

receive, from the user device, an indication that the first item is present at the physical location; and send, to the user device for display, a destination to which to bring a container holding the first item.

2. The system of claim 1, wherein the instructions further cause the at least one processor to:

receive an indication, from the user device, that a first container is full, and send a prompt to the user device requesting a container identifier associated with a second container.

3. The system of claim 2, wherein the second container is a different size than the first container.

4. The system of claim 1, wherein the instructions further cause the at least one processor to:

receive an indication, from the user device, to move a second item from a first container to a second container;

receive, from the user device, a first container identifier;

receive, from the user device, an item identifier associated with the second item to be moved; and receive, from the user device, a second container identifier.

5. The system of claim 1, wherein the instructions further cause the at least one processor to receive a batch identifier representing a batch to be fulfilled from the user device or from a server.

6. The system of claim 1, wherein the instructions further cause the at least one processor to receive at least one of an item identifier associated with the first item, a physical location identifier, or a container identifier associated with a first container for holding one or more items of an item list from the user device, the item list including the first item.

7. The system of claim 1, wherein the instructions further cause the at least one processor to send a batch identifier associated with a batch, a container identifier, an item identifier associated with the first item, and a physical location identifier to a server.

8. The system of claim 1, wherein the instructions further cause the at least one processor to:

determine a number of containers for holding items; and send, to a user device, the determined number of containers as an image.

9. The system of claim 8, wherein determining the number of containers comprises determining at least one of a weight or a volume of one or more items of an item list, the item list including the first item.

10. The system of claim 1, wherein the instructions further cause the at least one processor to receive a report from the user device of an error with one or more of items listed on an item list, the item list including the first item, the error including at least one of a shortage, a damaged barcode, a missing barcode, or damage.

11. A computer implemented method performed at a computing device, by at least one processor, the method comprising:

sending, to a user device for display, a map illustrating a physical location associated with a first item;

sending, to the user device for display, at least one of an image of the first item, a volume of the first item, or a weight of the first item;

receiving, from the user device, an indication that the first item is present at the physical location; and sending, to the user device for display, a destination to which to bring a container holding the first item.

12. The method of claim 11, further comprising:

receiving an indication, from the user device, that a first container is full, and sending a prompt to the user device requesting a container identifier associated with a second container.

13. The method of claim 12, wherein the second container is a different size than the first container.

14. The method of claim 11, further comprising:

receiving an indication, from the user device, to move a second item from a first container to a second container;

receiving, from the user device, a first container identifier;

receiving, from the user device, an item identifier associated with the second item to be moved; and receiving, from the user device, a second container identifier.

15. The method of claim 11, further comprising receiving a batch identifier representing a batch to be fulfilled from the user device or from a server.

16. The method of claim 11, further comprising receiving at least one of an item identifier associated with the first item, a physical location identifier, or a container identifier associated with a first container for holding one or more items of an item list from the user device, the item list including the first item.

17. The method of claim 11, further comprising determining a number of containers for holding items; and sending, to a user device, the determined number of containers as an image.

18. The method of claim 17, wherein determining the number of containers comprises determining at least one of a weight or a volume of one or more items of an item list, the item list including the first item.

19. The method of claim 11, further comprising receiving a report from the user device of an error with one or more of items listed on an item list, the item list including the first item, the error including at least one of a shortage, a damaged barcode, a missing barcode, or damage.

20. A computer-implemented system for fulfilling a batch in a fulfillment center, comprising:

at least one processor;

at least one memory storing instructions, wherein the instructions cause the at least one processor to:

send, to a user device for display, a signal for informing a user of a physical location associated with an item;

send, to the user device for display, at least one of an image of the item, a volume of the item, or a weight of the item;

receive, from the user device, an indication that the item is present at the physical location; and send, to the user device for display, a destination to which to bring a container holding the item.

* * * * *